United States Patent
Jia

(10) Patent No.: US 12,219,392 B2
(45) Date of Patent: Feb. 4, 2025

(54) MANAGEMENT OF BANDWIDTH PART SWITCHING

(71) Applicant: AT&T Intellectual Property I, L.P., Atlanta, GA (US)

(72) Inventor: Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 405 days.

(21) Appl. No.: 17/654,268

(22) Filed: Mar. 10, 2022

(65) Prior Publication Data

US 2023/0308948 A1    Sep. 28, 2023

(51) Int. Cl.
*H04W 28/24* (2009.01)
*H04W 28/08* (2023.01)
*H04W 28/082* (2023.01)
*H04W 72/51* (2023.01)
*H04W 72/542* (2023.01)

(52) U.S. Cl.
CPC ..... *H04W 28/082* (2023.05); *H04W 28/0967* (2020.05); *H04W 28/24* (2013.01)

(58) Field of Classification Search
CPC .......... H04W 28/082; H04W 28/0967; H04W 28/24; H04W 72/51; H04W 72/543; H04W 36/06
See application file for complete search history.

(56) References Cited

U.S. PATENT DOCUMENTS 10,993,254 B2 *   4/2021   Ang ................. H04W 72/0446
11,006,442 B2 *   5/2021   Salah ................... H04L 5/0091
11,228,976 B2 *   1/2022   Wu ...................... H04W 36/06
11,283,674 B2 *   3/2022   Cirik ..................... H04B 7/088
11,394,520 B2 *   7/2022   Li ........................ H04W 72/543
11,758,529 B2 *   9/2023   Zhou .................... H04W 72/30
                                                              370/329
11,943,792 B2 *   3/2024   Mondet ............... H04W 72/044
12,058,660 B2 *   8/2024   Lee ................... H04W 72/0453
2019/0289513 A1 *   9/2019   Jeon ................. H04W 72/0453

(Continued)

FOREIGN PATENT DOCUMENTS

CN            110958179 B   * 10/2021   ........... H04L 45/302

OTHER PUBLICATIONS

"5G; NR; Physical channels and modulation (3GPP TS 38.211 version 15.8.0 Release 15)," Technical Specification, ETSI TS 138 211 V15.8.0 (Jan. 2020), 100 pages.

*Primary Examiner* — Ahmed Elallam

(57) ABSTRACT

Switching a device between bandwidth parts of a channel bandwidth can be managed. A bandwidth part (BWP) management component (BWPMC) can determine characteristics relating to communication rate, quality of service (QoS), or device power based on analysis of data relating to operation of the device, including data relating to service type of a service used by the device or traffic type of data communicated by the device. If heavy traffic is detected, BWPMC can determine whether switching from a smaller BWP to a larger BWP can improve communication rate or QoS. If so, BWPMC can initiate a switching timer. If heavy traffic is still detected when timer has ended, BWPMC can switch from smaller BWP to larger BWP, set another timer, and check again when that timer ends. BWPMC can bypass BWP switching for the device when power saving mode is on or low battery power is detected.

20 Claims, 12 Drawing Sheets

(56) References Cited

U.S. PATENT DOCUMENTS

| | | | |
|---|---|---|---|
| 2021/0185614 A1* | 6/2021 | Zhou | H04L 5/0096 |
| 2021/0250792 A1* | 8/2021 | Shi | H04B 17/309 |
| 2022/0167338 A1* | 5/2022 | Cao | H04W 72/20 |
| 2023/0122848 A1* | 4/2023 | Kim | H04L 5/001 |
| | | | 455/522 |
| 2023/0124671 A1* | 4/2023 | Lee | H04W 36/06 |
| | | | 370/329 |
| 2023/0126370 A1* | 4/2023 | Islam | H04W 28/0257 |
| | | | 370/329 |
| 2023/0232384 A1* | 7/2023 | Ma | H04W 72/23 |
| | | | 370/329 |
| 2023/0319805 A1* | 10/2023 | Vankayala | G06N 3/084 |
| | | | 370/329 |
| 2024/0049035 A1* | 2/2024 | He | H04L 5/001 |
| 2024/0121025 A1* | 4/2024 | Zhang | H04W 52/262 |

* cited by examiner

MANAGEMENT OF BANDWIDTH PART SWITCHING

TECHNICAL FIELD

This disclosure relates generally to electronic communications, e.g., to management of bandwidth part switching.

BACKGROUND

Communication devices can communicate data to other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding electronic communications, and is not intended to be exhaustive.

DETAILED DESCRIPTION

Figure 1:
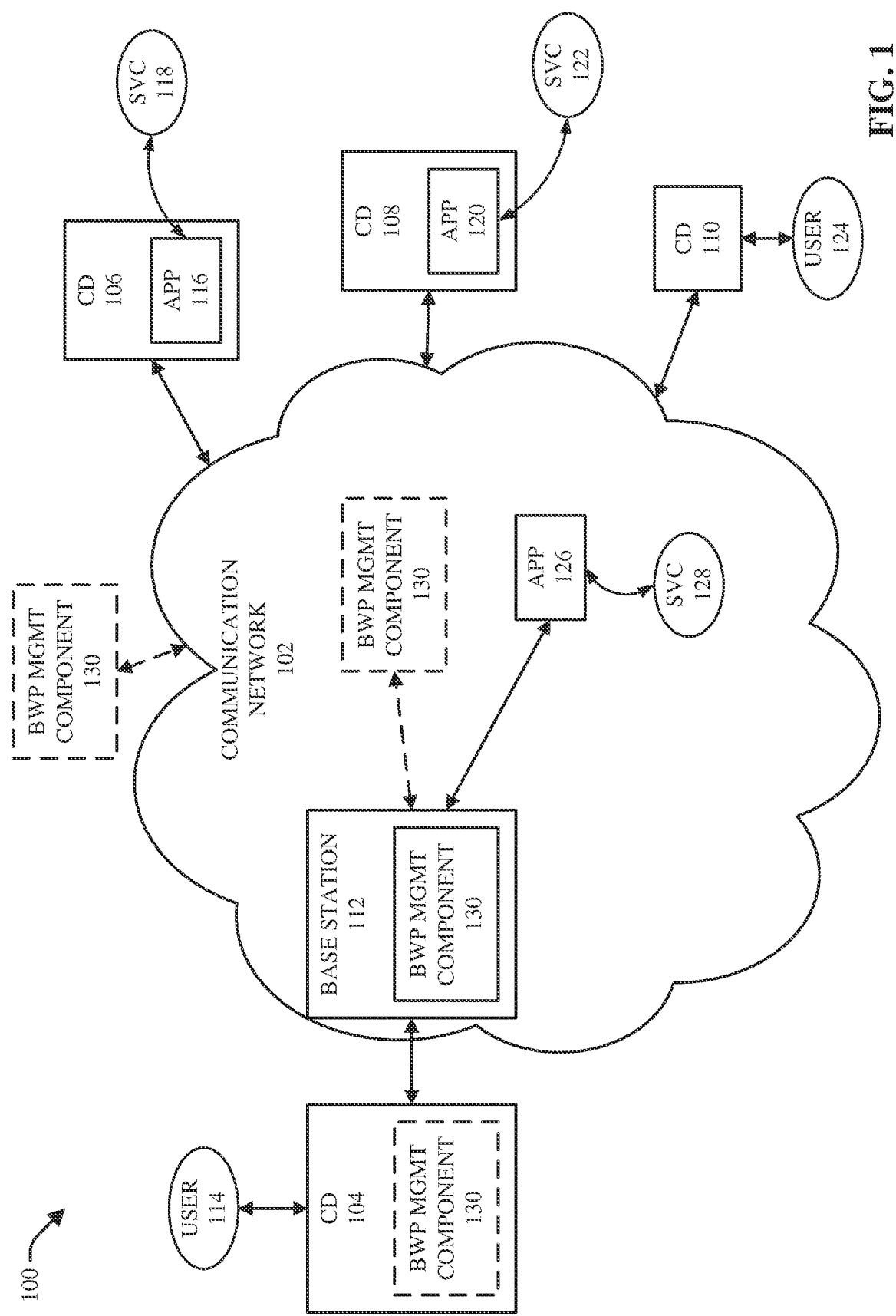
FIG. 1 illustrates a block diagram of an example system that can manage bandwidth part (BWP) switching associated with one or more communication devices, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to managing switching communication devices between bandwidth parts (BWPs) of a channel bandwidth. The disclosed subject matter can provide various benefits to users using communication devices in a communication network, service providers that provide services to communication devices, and carriers (e.g., mobile carriers) and other organizations that operate communication networks.

The disclosed subject matter can employ desirable (e.g., more efficient, enhanced, or optimized) BWP management techniques (e.g., BWP switching management techniques), applications, and/or mechanisms that can enhance (e.g., increase, improve, or optimize) operation and performance of communication devices and communication networks, such as, for example, a mobile, wireless, or cellular communication network. The BWP management techniques can be employed (e.g., applied or utilized) to desirably trigger BWP switching for a communication device based at least in part on the data traffic associated with the communication device, service type of a service utilized by the communication device, battery power level of a battery of the communication device, and/or other characteristics or factors, such as described herein. The BWP management techniques can employ adaptive BWP switching for different communication network implementations, such as, for example, frequency-division multiplexing (FDM)-based BWP switching and/or time-division multiplexing (TDM)-based BWP switching. The disclosed BWP management techniques also can avoid undesirable (e.g., unnecessary or unwanted) BWP switching associated with communication device, which can thereby mitigate (e.g., reduce, minimize, or prevent) degradation of communication network performance or user experience of users of communication devices. The disclosed BWP management techniques also can provide a communication device user with a desirable alternative with regard to BWP switching to reduce power consumption by the communication device, and such alternative can include user or device request or preference (e.g., request for power saving mode on the communication device) in the network decision of BWP switching with regard to the communication device, such as described herein.

Also, as the communication network loading fluctuates over time, depending on the number of communication devices served in a cell at a given time (e.g., during busy hours of the cell), the disclosed BWP management techniques can be employed to achieve desirable (e.g., suitable, enhanced, or optimal) resource, capacity, and power consumption saving gains for the communication network by desirably (e.g., suitably, enhancedly, or optimally) managing and/or adapting BWPs for communication devices. As data usage fluctuates per applications on or associated with communication devices, depending in part on the usage status (e.g., idle status, connected status) associated with communication devices and data bursts while connected due to, for example, instant messaging, streaming video, electronic gaming, or other data communications or use of services, the disclosed BWP management techniques can be employed to achieve desirable (e.g., suitable, enhanced, or optimal) resource and power consumption saving gains for communication devices by desirably (e.g., suitably, enhancedly, or optimally) managing and/or adapting BWPs for communication devices. The disclosed BWP management techniques, including dynamic BWP adaptation, can provide finer-granularity energy savings for communication devices and communication networks via BWP-based channel bandwidth adaptation, such as described herein.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also can employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiply with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; Internet of Things (IoT) device; or other communication device) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network. Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations.

The maximum channel bandwidth in LTE is 20 megahertz (MHz), and this bandwidth can be supported by most LTE communication devices, except for certain lower cost IoT-type devices, including, for example, certain category (Cat) M (Cat-M; also referred to as LTE-M) and narrowband (NB)-IoT devices. In 5G NR, the maximum channel bandwidth can be 100 MHz for FR1 frequency bands (e.g., N77) and 400 MHz for FR2 (e.g., millimeter wave (mmWave) frequency band). A communication device may not have to monitor, and it can be desirable to not have the communication device monitor, the whole frequency band (e.g., FR1 frequency band, or FR2 frequency band) in all scenarios. Additionally, some lower cost communication devices may not want to support such large channel bandwidth due to limited radio capability.

To that end, techniques for managing switching between bandwidth parts of a channel bandwidth associated with a communication device are presented. A BWP management component can manage (e.g., control) switching of a communication device between BWPs of a channel bandwidth, in accordance with defined BWP management criteria. A BWP can comprise a subset of common physical resource blocks (PRBs) (e.g., contiguous common PRBs) of a set of common PRBs. A communication device (e.g., user equipment (UE)). In some embodiments, a communication device can be configured with up to four BWPs (or more, in other embodiments) in the uplink (UL) or up to four BWPs (or more, in other embodiments) in the downlink (DL). In certain embodiments, a communication device can be configured with up to an additional four BWPs (or more, in other embodiments) in a supplementary UL. In some embodiments, only one of the available BWPs in the UL and one of the available BWPs in the DL can be active at a given time. This can mean that the communication device cannot transmit PUSCH or PUCCH and cannot receive PDSCH or PDCCH outside of an active BWP.

The BWP management component can determine the device capability of the communication device and the network configuration of the communication network with regard to supported BWP types (e.g., FDM or TDM) and the number of BWPs (e.g., one, two, three, four, or more BWPs) based at least in part on the results of analyzing device-related information received from or associated with the communication device and network-related information of the communication network. In some embodiments, during a data session, at least initially, the communication device can be set to monitor or scan a smaller BWP (e.g., monitor a smaller amount of the channel bandwidth in the frequency domain, or sparse scanning of the channel bandwidth in the time domain) of the channel bandwidth. The BWP management component can determine whether to switch from the smaller BWP to a larger BWP to have the communication device monitor or scan the larger BWP (e.g., monitor a larger amount of the channel bandwidth in the frequency domain, or fuller scanning of the channel bandwidth in the time domain), in accordance with the defined BWP management criteria.

The BWP management component can determine one or more characteristics relating to operation of the communication device, such as one or more characteristics relating to communication rate associated with a data session between the communication device and another device (e.g., an application and associated service provided via the other device), quality of service (QoS) associated with the data session, or device power of the communication device based at least in part on an analysis of data relating to the operation of the communication device, including data relating to a service type of a service used by the communication device or a traffic type of data communicated between the communication device and the other device during the data session. For instance, based at least in part on the analysis results, the BWP management component can determine the service type of the service, the traffic type of the data traffic, the communication rate of the communication of the data traffic between the communication device and the communication network during a data session, QoS of the data session, whether power saving mode (PSM) is set to the on state on the communication device, a battery power level of a battery of the communication device, whether the communication device is connected to an external power source (e.g., alternating current (AC) power source associated with a power grid, or an external battery), and/or another characteristic. With regard to the characteristics (e.g., service type, traffic type, or communication rate), and based at least in part on the analysis results, the BWP management component can determine whether the data session involves a heavier level of data traffic (e.g., video streaming, video call, electronic gaming, or other type of heavier level data traffic) or a lighter level of data traffic (e.g., text message, email browsing, idle mode, or other type of lighter level data traffic), the current communication rate or a desired (e.g., increased, improved, or target) communication rate, a current QoS or a desired (e.g., increased, improved, or target) QoS, a priority level of the data traffic or the service, a current PSM setting of the communication device, and/or a current battery power level of the communication device.

If a heavier level of data traffic or a higher priority level associated with the data traffic is detected by the BWP management component, the BWP management component can determine whether switching from the smaller BWP to a larger BWP can improve (e.g., increase or optimize) the communication rate or the QoS. If the BWP management component determines that switching from the smaller BWP to the larger BWP can improve the communication rate or the QoS, the BWP management component can initiate a switching timer. If, after the amount of time of the switching timer has elapsed, the BWP management component determines that the heavier level of data traffic or the higher priority level is no longer detected (e.g., the data session was a relatively short data session that has ended), the BWP management component can determine that the communication device can remain at the smaller BWP and is not to be switched to utilize the larger BWP.

If, instead, after the amount of time of the switching timer has elapsed, the BWP management component determines that the heavier level of data traffic or the higher priority level is still occurring, the BWP management component can determine that the communication device is to switch from utilizing the smaller BWP to utilizing the larger BWP, and can switch or facilitate switching of the communication device from utilizing the smaller BWP to utilizing the larger BWP. The BWP management component can set a switching timer (e.g., the same or a different switching timer), and, after the amount of time of the switching timer has elapsed, the BWP management component can check (e.g., evaluate) again to determine whether the heavier level of data traffic or the higher priority level is still occurring. If so, the BWP management component can control BWP switching to continue to have the communication device utilize the larger BWP during the data session. If, instead, the BWP management component determines that heavier level of data traffic or higher priority level associated with the data traffic is no longer detected (e.g., the data session has ended and/or no heavier data traffic application(s) is being used), the BWP management component can determine that the communication device is to switch from utilizing the larger BWP to utilizing a smaller BWP (e.g., the previous smaller BWP or a different but relatively smaller BWP that is smaller than the larger BWP), and can switch or facilitate switching of the communication device from utilizing the larger BWP to utilizing the smaller BWP.

In some embodiments, the BWP management component can bypass BWP switching for the communication device during a data session, for example, when the communication device is determined to be in PSM or determined to have a low battery power level (e.g., a battery power level below a defined threshold battery power level), and the BWP management component can control BWP switching to have the communication device utilize the smaller BWP during the data session, in accordance with the defined BWP management criteria, such as more fully described herein.

These and other aspects and embodiments of the disclosed subject matter will now be described with respect to the drawings.

Referring now to the drawings, FIG. 1 illustrates a block diagram of an example system 100 that can manage BWP switching associated with one or more communication devices, in accordance with various aspects and embodiments of the disclosed subject matter. The system 100 can comprise a communication network 102 can comprise a mobility core network (e.g., a wireless communication network) and/or a packet data network (e.g., an Internet Protocol (IP)-based network, such as the Internet and/or intranet) that can be associated with the mobility core network.

The mobility core network (e.g., LTE, 5G, or other next generation (e.g., xG) core network) of the communication network 102 can operate to enable wireless communication between communication devices and/or between a communication device and the communication network 102. The communication network 102 can comprise various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other devices) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, communication device (CD) 104, communication device 106, communication device 108, and communication device 110 can attach or connect, or attempt to attach or connect, to the communication network 102 to communicate with other communication devices associated with the communication network 102. A communication device (e.g., 104, 106, 108, or 110) also can be referred to as, for example, a device, a mobile device, or a mobile communication device. The term communication device can be interchangeable with (or include) a UE or other terminology. A communication device (or UE, device, or other similar term) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). In some embodiments, a communication device (e.g., 104) can be connected to the communication network 102 via a wireless communication connection. In certain embodiments, a communication device (e.g., 106) can be connected to the communication network 102 (e.g., a wireline and/or IP-based network portion of the communication network 102) via a wireline communication connection.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data traffic and voice traffic can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can comprise various network components or devices, which can include one or more RANs (not explicitly shown in FIG. 1), wherein each RAN can comprise or be associated with a set of base stations (e.g., access points (APs)), such as base station 112, that can serve communication devices located in respective coverage areas served by respective base stations in the mobility core network of the communication network 102. The respective base stations (e.g., 112) can be associated with one or more sectors (not shown), wherein respective sectors can comprise respective cells. The cells can have respective coverage areas that can form the coverage area covered by the one or more sectors. The respective communication devices can be communicatively connected to the communication network 102 via respective wireless or wireline communication connections with one or more of the respective cells.

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other type of network element) from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

The communication device 104 can be associated with one or more users, such as user 114. The communication device 106 can be associated with one or more applications and associated services, such as, for example, application (APP) 116 and service (SVC) 118. The communication device 108 also can be associated with one or more applications and associated services, such as, for example, application 120 and service 122. The communication device 110 can be associated with one or more users, such as user 124. The communication network 102 also can comprise and provide one or more applications and associated services, such as, for example, application 126 and service 128.

At various times, and under various scenarios, a communication device (e.g., 104) can desire to utilize one or more applications (e.g., 116, 120, or 126) and associated services (e.g., 118, 122, or 128) and/or can desire to communicate with another communication device (e.g., 110) associated with another user (e.g., 124). The applications and services can relate to, for example, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities. Utilization of some applications and services under some scenarios (e.g., using an application or service for video streaming, a video call, electronic gaming, certain medical-related data communications, or certain emergency, military, law enforcement, fire response, disaster response data communications) can involve a heavier level of data traffic, and/or can involve higher priority data traffic, being communicated via the communication network 102 than the relatively lighter data traffic, and/or relatively lower priority data traffic, that can be communicated when certain applications or services are utilized under other scenarios (e.g., using an application or service for communicating an ordinary text message, browsing an ordinary email, or viewing a web page).

In LTE, the maximum channel bandwidth is 20 MHz, and this bandwidth can be supported by most LTE communication devices, except for certain lower cost IoT-type devices (e.g., Cat-M or NB-IoT devices). In 5G NR, the maximum channel bandwidth can be 100 MHz for FR1 frequency bands (e.g., N77) and 400 MHz for FR2 (e.g., mmWave frequency band). A communication device may not have to monitor the whole frequency band (e.g., FR1 frequency band or FR2 frequency band) in all scenarios. It can be desirable in some scenarios to not have a communication device monitor the entire frequency band, for example, because monitoring the entire frequency band can utilize more resources (e.g., computing resources, power resources) associated with a communication device than monitoring only a portion of the frequency band and, for some services (e.g., sending ordinary text messages, accessing an ordinary email) or applications being used by the communication device, monitoring the entire frequency band may not provide any improvement in the service and/or may unnecessarily utilize resources associated with the communication device. Also, some lower cost communication devices may not want to support such large channel bandwidth (e.g., the entire FR1 or FR2 frequency band) due to limited radio capability.

To that end, in accordance with various embodiments, the system 100 can comprise a BWP management component (BWP MGMT COMPONENT) 130 that can manage (e.g., control) switching between BWPs associated with communication devices, in accordance with the defined BWP management criteria. The BWP management component 130, by employing the disclosed BWP switching, can result in communication devices (e.g., 104, 106, 108, or 110) desirably utilizing less resources (e.g., computing resources, communication resources, power resources, time resources, or other resources), as compared to the amount of resources communication devices would otherwise use, and can result in the communication network 102 utilizing less resources (e.g., computing resources, communication resources, power resources, time resources, or other resources), as compared to the amount of resources the communication network 102 would otherwise use. In accordance with various embodiments, the BWP management component 130 can be located in the base station 112, elsewhere (e.g., in the RAN or other location) in the communication network 102, in a communication device (e.g., 104), or as a stand-alone device or in another communication device associated with (e.g., communicatively connected to) the communication network 102.

The number of BWPs that can be supported by a communication device (e.g., 104) can vary for different types of devices. For instance, some communication devices only may be able to support one BWP, other communication devices may be able to support two, three, four, or even more BWPs. Also, some communication devices may be able to support a desired number of BWPs on the UL and DL channels, and further can support a desired number of BWPs on a supplementary UL channel, such as more fully described herein. The BWP types supported by a communication device also can vary for different types of communication devices. For example, a communication device may be able to support BWP in the frequency domain (e.g., FDM), or may be able to support BWP in the time domain (e.g., TDM). In some embodiments, only one of the available BWPs in the UL and one of the available BWPs in the DL can be active at a given time. This can mean that the communication device cannot transmit physical UL shared channel (PUSCH) or physical UL control channel (PUCCH) and cannot receive physical DL shared channel (PDSCH) or physical DL control channel (PDCCH) outside of an active BWP.

With regard to the communication network 102, depending on the network configuration of the communication network 102, the communication network 102 may be able to support one, two, three, four, or even more BWPs. Also, depending on the network configuration of the communication network 102, the communication network 102 may be able to support BWP in the frequency domain or BWP in the time domain.

When a communication device, such as communication device 104, desires to utilize an application and associated service, such as application 116 and service 118 associated with communication device 106, the BWP management component 130 can manage switching of the communication device 104 (and/or communication device 106) between BWPs, in accordance with the defined BWP management criteria, such as described herein. The communication device 104 can be camping on a frequency band (e.g., n77 frequency band, mmWave frequency band, or other frequency band) that can have a channel bandwidth (e.g., carrier bandwidth) of a certain size (e.g., 100 MHz, 400 MHz, or other size). A call or data session setup (e.g., SA call setup) on the frequency band can be performed by the communication device 104 and/or base station 112.

Figure 2:
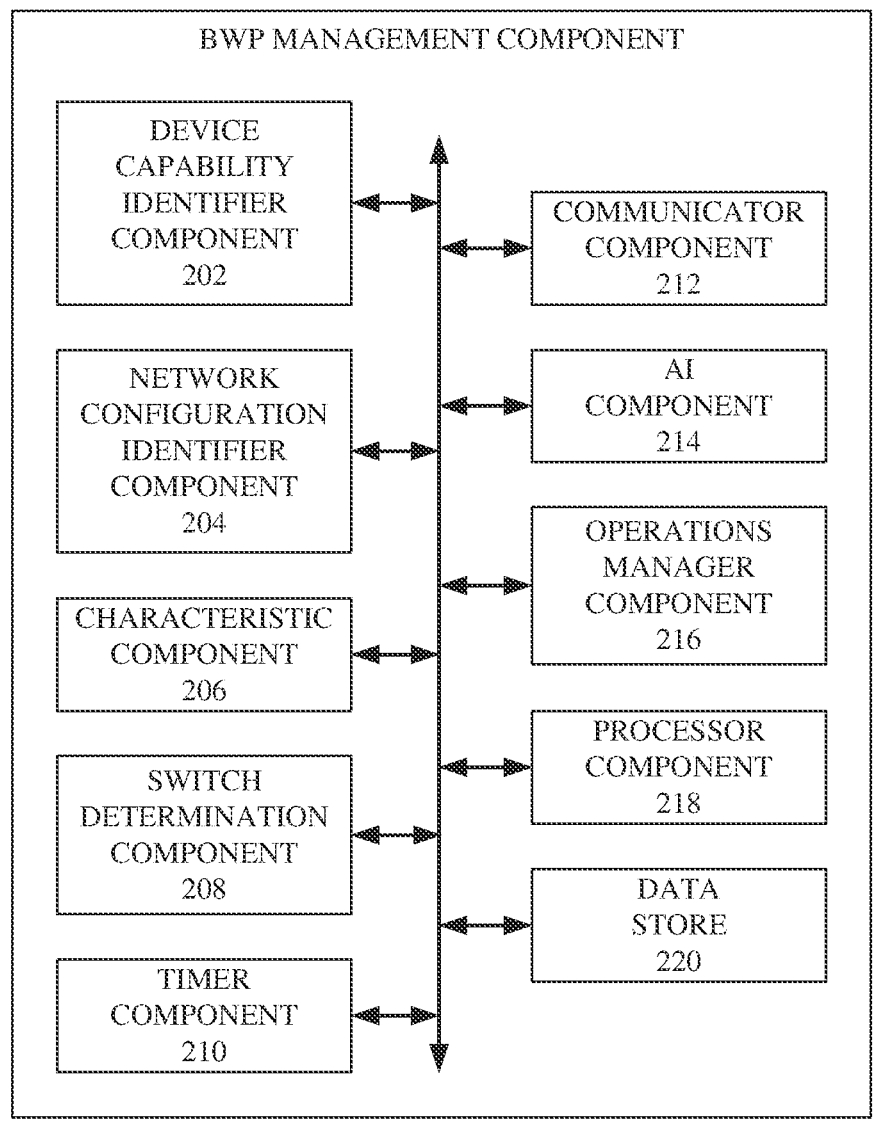
FIG. 2 depicts a block diagram of an example BWP management component, in accordance with various aspects and embodiments of the disclosed subject matter.

Referring to FIG. 2 (along with FIG. 1), FIG. 2 depicts a block diagram of an example BWP management component 130, in accordance with various aspects and embodiments of the disclosed subject matter. With the call or data session set up for the communication device 104, the BWP management component 130 can perform a BWP switching potentiality check to determine the device capabilities and network configuration with regard to supported BWP types and number of BWPs for the communication device 104 and communication network 102, respectively. The BWP management component 130 can comprise a device capability identifier component 202 that can obtain device-related information from the communication device 104 or another data source (e.g., data store in the base station 112 or elsewhere in the communication network 102, or an external data source), wherein the device-related information can indicate the BWP types (e.g., FDM or TDM) and number of BWPs (e.g., one, two, three, four, or more BWPs) supported by the communication device 104. For reasons of brevity and clarity, in some example scenarios and embodiments described herein, the communication device 104 can be described as supporting two different BWPs (e.g., a first or smaller BWP, and a second or larger BWP), although it is to be appreciated and understood that, in other embodiments, a communication device can support more than two BWPs. Based at least in part on the results of analyzing the device-related information, the device capability identifier component 202 can determine the BWP type(s) (e.g., FDM or TDM) and the number of BWPs (e.g., two BWPs) supported by the communication device 104.

The BWP management component 130 also can comprise a network configuration identifier component 204 that can comprise or obtain network-related information from the communication network 102 or another data source (e.g., data store in the base station 112 or elsewhere in the communication network 102), wherein the network-related information can indicate the BWP types (e.g., FDM or TDM) and number of BWPs (e.g., one, two, three, four, or more BWPs) supported by the communication network 102. Based at least in part on the results of analyzing the network-related information, the network configuration identifier component 204 can determine the BWP type(s) (e.g., FDM or TDM) and the number of BWPs (e.g., one, two, three, four, or more BWPs) supported by the communication network 102. Also, based at least in part on the results of analyzing the device-related information and the network-related information, the BWP management component 130 also can determine the supported BWP type(s) that the communication device 104 and communication network 102 have in common, and the supported BWPs that the communication device 104 and communication network 102 have in common, and can employ or facilitate employing such commonly supported BWP type(s) and BWPs (e.g., the first or smaller BWP, and the second or larger BWP).

Figure 3:
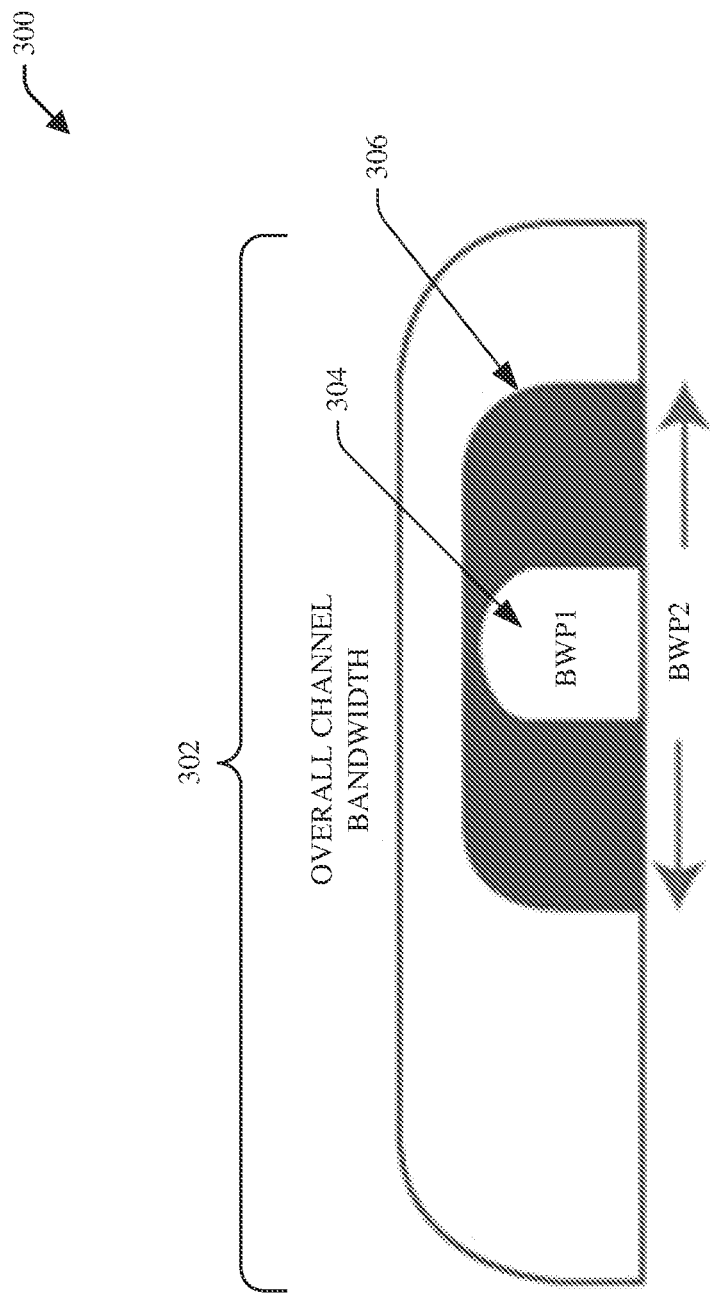
FIG. 3 illustrates a diagram of example BWPs of a channel bandwidth when a communication device is operating in the frequency domain, in accordance with various aspects and embodiments of the disclosed subject matter.

Referring briefly to FIG. 3 (along with FIGS. 1 and 2), FIG. 3 illustrates a diagram of example BWPs 300 of a channel bandwidth when a communication device is operating in the frequency domain, in accordance with various aspects and embodiments of the disclosed subject matter. In the example BWPs 300, there can be an overall channel (e.g., carrier) bandwidth 302 that can span a desired amount of bandwidth (e.g., 100 MHz for an FR1 frequency band, or 400 MHz for an FR2 frequency band). In the example BWPs 300, there can be two different BWPs, a first (e.g., smaller) BWP 304 (BWP1) and a second (e.g., larger) BWP 306 (BWP2), although, in other embodiments, there can be more than two BWPs employed. When the communication device (e.g., 104) is switched to have it utilize the first (e.g., smaller) BWP 304 and is operating in the frequency domain (e.g., if FDM is supported), the communication device (e.g., 104) can monitor or scan a relatively smaller part (e.g., smaller portion or amount) of the channel bandwidth 302 (e.g., can monitor or scan only a 20 MHz, 30 MHz, or other relatively smaller portion of the channel bandwidth). When the communication device (e.g., 104) is switched to have it utilize the second (e.g., larger) BWP 306 and is operating in the frequency domain (e.g., if FDM is supported), the communication device (e.g., 104) can monitor or scan a relatively larger part (e.g., larger portion or amount) of the channel bandwidth 302 (e.g., can monitor or scan a 40 MHz, 50 MHz, or other relatively larger portion of the channel bandwidth), although the second BWP 306 still can involve monitoring or scanning less than the full channel bandwidth 302.

Figure 4:
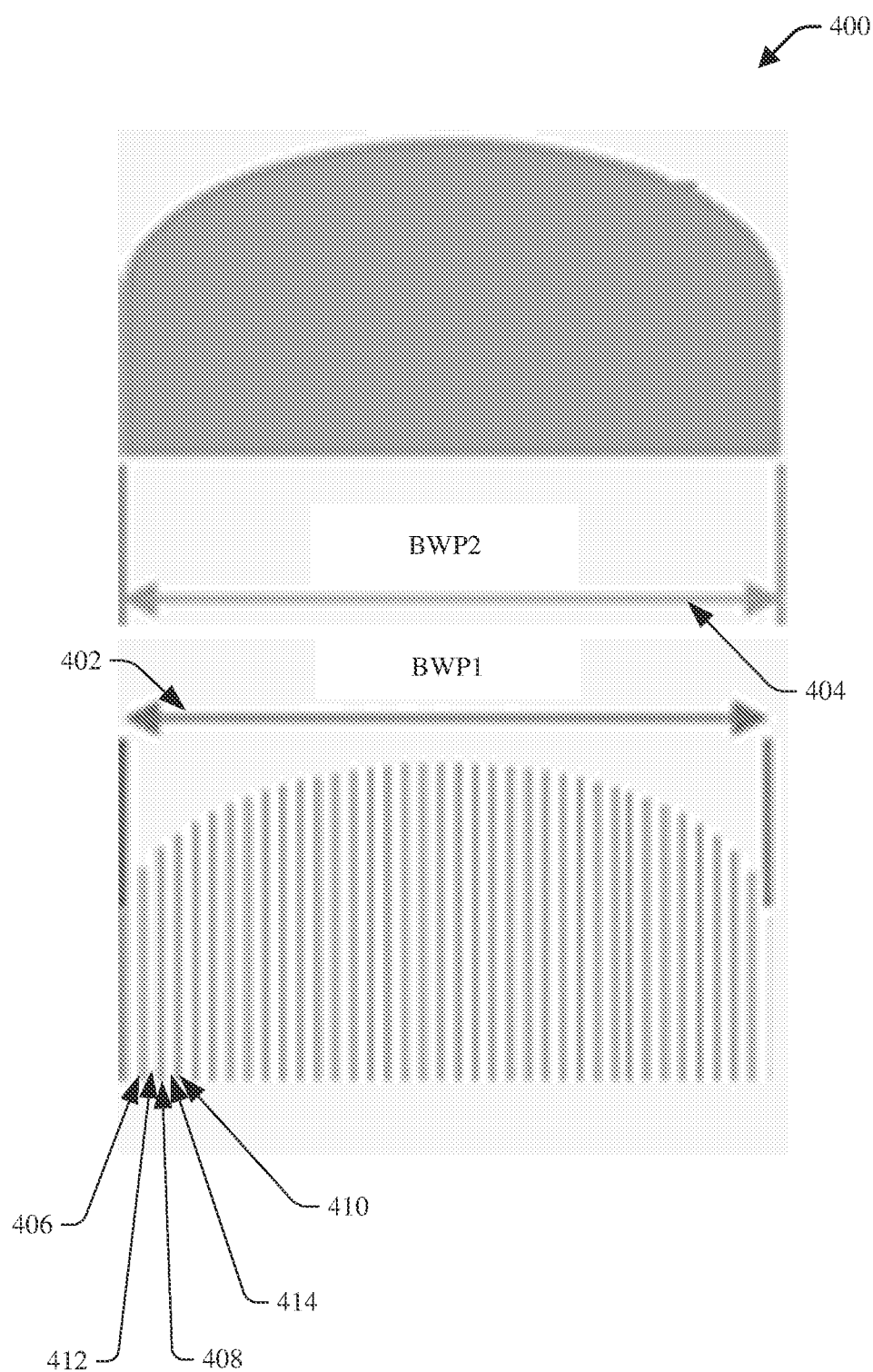
FIG. 4 depicts a diagram of example BWPs of a channel bandwidth when a communication device is operating in the time domain, in accordance with various aspects and embodiments of the disclosed subject matter.

Turning briefly to FIG. 4 (along with FIGS. 1, 2, and 3), FIG. 4 depicts a diagram of example BWPs 400 of a channel bandwidth when a communication device is operating in the time domain, in accordance with various aspects and embodiments of the disclosed subject matter. With regard to the example BWPs 400, there can be an overall channel (e.g., carrier) bandwidth that can span a desired amount of bandwidth (e.g., 100 MHz for an FR1 frequency band, or 400 MHz for an FR2 frequency band). In the example BWPs 400, there can be two different BWPs, a first (e.g., smaller) BWP 402 (BWP1) and a second (e.g., larger) BWP 404 (BWP2), although, in other embodiments, there can be more than two BWPs employed. When the communication device (e.g., 104) is switched to have the communication device utilize the second (e.g., larger) BWP 404, and the communication device is operating in the time domain (e.g., if TDM is supported), the communication device (e.g., 104) can perform a fuller scan of the channel bandwidth (although the portion of the channel bandwidth scanned can be less than (e.g., half of, or other desired lesser portion of) the entire channel bandwidth). When the communication device (e.g., 104) is switched to have the communication device utilize the first (e.g., smaller) BWP 402, and the communication device is operating in the time domain, the communication device (e.g., 104) can perform a relatively sparse scan of the channel bandwidth where the region of the channel bandwidth that is scanned can be the same or substantially the same region that can be scanned when utilizing the second BWP 404, but where the communication device can scan fewer portions of that region of the channel bandwidth than the communication device scans when it utilizes the second BWP 404. For instance, when utilizing the first BWP 402, the communication device can scan a first portion 406, a second portion 408, and a third portion 410 of the region of the channel bandwidth, but can bypass or omit scanning of a fourth portion 412 and a fifth portion 414 of the channel bandwidth located in between the first portion 406, second portion 408, and third portion 410, respectively.

Figure 5:
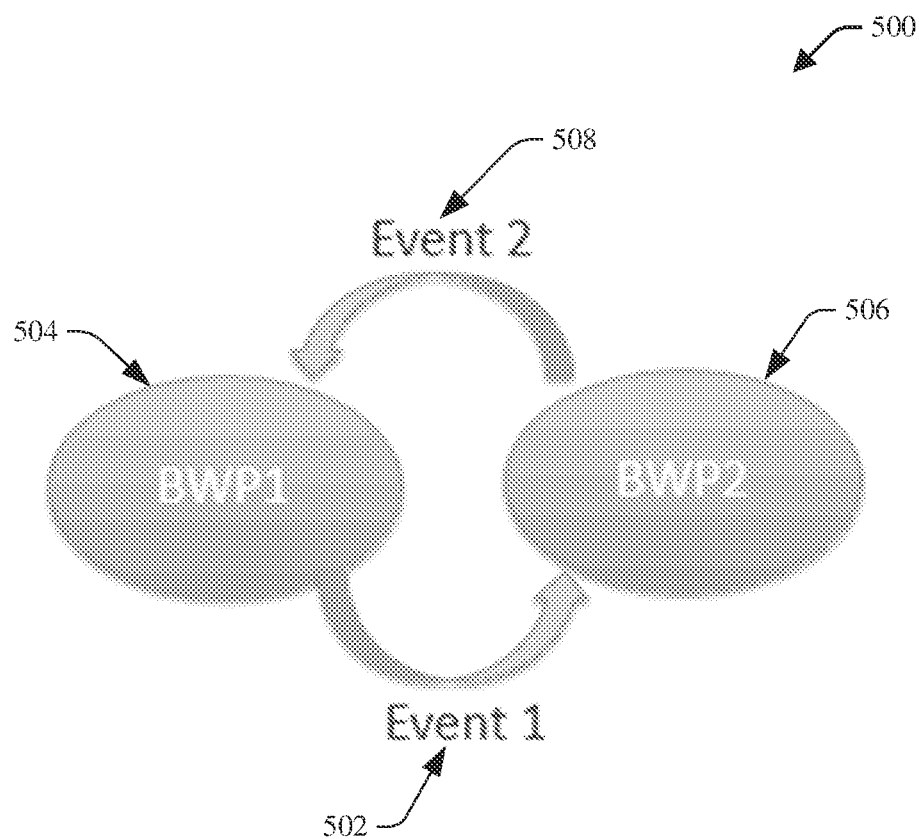
FIG. 5 illustrates a diagram of example BWP switching based at least in part on determined or estimated data traffic types, in accordance with various aspects and embodiments of the disclosed subject matter.

In some embodiments, the BWP management component 130 can determine whether to trigger BWP switching based at least in part on determined or estimated data traffic types, in accordance with the defined BWP management criteria. Referring to FIG. 5 (along with FIGS. 1, 2, 3, and 4), FIG. 5 illustrates a diagram of example BWP switching 500 based at least in part on determined or estimated data traffic types, in accordance with various aspects and embodiments of the disclosed subject matter. For example, during (e.g., in response to) a first event 502 (event 1), the BWP management component 130 can switch BWPs from having the communication device 104 utilize the first (e.g., smaller) BWP 504 (e.g., to have the first BWP 504 be active) to utilizing the second (e.g., larger) BWP 506 (e.g., to have the second BWP 506 be active) in response to the BWP management component 130 determining or estimating that the communication device 104 is utilizing an application (e.g., video streaming application or electronic gaming application) that can involve a heavier data traffic level (e.g., during a connected mode), in accordance with the defined BWP management criteria, such as described herein. During (e.g., in response to) a second event 508 (event 2), the BWP management component 130 can have the communication device 104 switch back from using the second BWP 506 to utilizing the first BWP 504 in response to the BWP management component 130 determining or estimating that the communication device 104 is utilizing (e.g., has switched to utilizing) an application (e.g., texting application or email application) that can involve a relatively lighter data traffic level (e.g., during a connected mode) or in response to determining or estimating that the communication device 104 is in an idle mode.

As another example, additionally or alternatively, during (e.g., in response to) a first event 502 (event 1), the BWP management component 130 can switch BWPs from having the communication device 104 utilize the first (e.g., smaller) BWP 504 to utilizing the second (e.g., larger) BWP 506 in response to the BWP management component 130 determining or estimating that the communication device 104 is utilizing an application (e.g., disaster response application and associated service, certain medical-related applications and associated services) that can involve communication of higher priority or higher QoS data traffic (e.g., during a connected mode), in accordance with the defined BWP management criteria, such as described herein. During (e.g., in response to) a second event 508 (event 2), the BWP management component 130 can have the communication device 104 switch back from utilizing the second BWP 506 to utilizing the first BWP 504 in response to the BWP management component 130 determining or estimating that the communication device 104 is utilizing (e.g., has switched to utilizing) an application (e.g., certain texting or email applications) that can involve a relatively lower priority or lower QoS data traffic (e.g., during a connected mode) or in response to determining or estimating that the communication device 104 is in the idle mode.

In some embodiments, to facilitate determining whether to switch between BWPs, the BWP management component 130 can comprise a characteristic component 206 that can determine a group of characteristics associated with a data session of a communication device (e.g., 104). For instance, the characteristic component 206 can obtain data relating to operation of the communication device 104, including data traffic-related data relating to the data traffic being communicated during the data session, service-related data relating to the service (e.g., 118, 122, or 128) the communication device 104 is utilizing during the data session, application-related data relating to the application (e.g., 116, 120, or 126) the communication device 104 is utilizing during the data session, data relating to user preferences of a user (e.g., 114) associated with the communication device 104, metadata associated with the data session, and/or other data relating to the communication device 104 and/or data session. The characteristic component 206 can determine a group of characteristics, comprising one or more characteristics, relating to operation of the communication device 104, such as one or more characteristics relating to a communication rate associated with the data session between the communication device and another device (e.g., an application and associated service provided via the other device (e.g., 106)), QoS associated with the data session, and/or device power of the communication device 104 based at least in part on the results of the analysis of the data relating to the operation of the communication device 104.

The data traffic-related data can be indicative of the type of data traffic being communicated during the communication session. The service-related data or application-related data can be indicative of a service type of the service (e.g., 118, 122, or 128) or application type of the application (e.g., 116, 120, or 126) being used by the communication device 104 during the data session. The user preferences of the user can indicate a preference with regard to a BWP(s), BWP switching, communication rate, QoS level, service or application performance level, power usage or conservation associated with the communication device, switching timer(s), or other characteristic, in connection with the use of a particular application or service during a data session. The user preferences can be determined from communication device settings configured by the user and/or from user preference data relating to user preferences that can be stored (e.g., in a data store) of the BWP management component 130 or the communication device (e.g., 104).

As an example, based at least in part on the analysis results, the characteristic component 206 can determine the service type of the service, the traffic type of the data traffic, application performance specifications (e.g., application performance requirements) associated with the application and/or known by the communication device, a user preference(s) of the user, the communication rate of the communication of the data traffic between the communication device and the communication network during a data session, QoS of the data session, a priority level or criticality level associated with the data traffic, whether PSM is set to the on state on the communication device, a battery power level of a battery of the communication device, whether the communication device is connected to an external power source (e.g., AC power source associated with a power grid, or an external battery), a user preference(s) of the user (e.g., 114) associated with the communication device, and/or another characteristic. With regard to the characteristics (e.g., service type, traffic type, communication rate, QoS, or other characteristic), and based at least in part on the analysis results, the characteristic component 206 can determine whether the data session involves a heavier level of data traffic (e.g., video streaming, video call, electronic gaming, or other type of heavier level data traffic) or a lighter level of data traffic (e.g., text message, email browsing, idle mode, or other type of lighter level data traffic), the current communication rate or a desired (e.g., increased, improved, or target) communication rate, a current QoS or a desired (e.g., increased, improved, or target) QoS, a current PSM setting of the communication device, a current battery power level of the communication device, and/or another characteristic.

In some embodiments, the characteristic component 206 can determine or infer a desired (e.g., increased, improved, or target) characteristic value (e.g., communication rate, QoS level, or other characteristic value) of a characteristic based at least in part on the determined service type, data traffic type, or characteristic value (e.g., current characteristic value) associated with the data session. In doing so, the characteristic component 206 can take into account the current BWP associated with the communication device (e.g., 104), including recognizing or determining to what extent the current BWP (e.g., smaller BWP) is keeping the current characteristic value from being higher than it otherwise potentially could be.

The BWP management component 130 also can comprise a switch determination component 208 that can analyze (e.g., evaluate) the group of characteristics, including associated values (e.g., communication rate, QoS level, battery power level, or other value), and can determine whether the BWP associated with a communication device (e.g., 104) is to be switched based at least in part on the results of such analysis, in accordance with the defined BWP management criteria. As part of such analysis, the switch determination component 208 can determine whether a characteristic value or a desired characteristic value associated with a characteristic associated with the data traffic of the data session satisfies a defined threshold characteristic value based at least in part on the results of a comparison of the characteristic value or desired characteristic value to the defined threshold characteristic value. The defined threshold characteristic value can be set or determined (e.g., by the BWP management component 130 or a user) based at least in part on the characteristic type of the characteristic and/or other desired factors, in accordance with the defined BWP management criteria.

For instance, the switch determination component 208 can determine whether the communication rate or the desired communication rate associated with the data traffic of the data session satisfies (e.g., meets or exceeds; or is at or greater than) a defined threshold communication rate based at least in part on the results of a comparison of the communication rate or desired communication rate to the defined threshold communication rate. The defined threshold communication rate can indicate whether the communication rate or the desired communication rate is associated with a heavier level of data traffic or a lighter level of data traffic, for example. If the switch determination component 208 determines that the communication rate or the desired communication rate does not satisfy (e.g., is below) the defined threshold communication rate, the switch determination component 208 can determine that there is a relatively lighter level of data traffic (e.g., lower data traffic level), and accordingly, can determine that switching from the first (e.g., smaller) BWP to the second (e.g., larger) BWP is not desirable and is not to be performed, at least at this time. If, instead, the switch determination component 208 determines that the communication rate or the desired communication rate satisfies the defined threshold communication rate, the switch determination component 208 can determine that there is a heavier level of data traffic (e.g., a sufficiently high data traffic level), and accordingly, it at least potentially can be desirable to switch from the first (e.g., smaller) BWP to the second (e.g., larger) BWP (e.g., provided other conditions or applicable BWP management criteria are satisfied).

In addition to, or as an alternative to, considering the communication rate associated with the data session, in certain embodiments, the switch determination component 208 can determine whether the QoS level or the desired QoS level associated with the data traffic satisfies (e.g., meets or exceeds; or is at or greater than) a defined threshold QoS level based at least in part on the results of a comparison of the QoS level or desired QoS level to the defined threshold QoS level. The defined threshold QoS level can indicate whether the QoS level or the desired QoS level are associated with a higher QoS level or a lower QoS level, for example. If the switch determination component 208 determines that the QoS level or the desired QoS level does not satisfy (e.g., is below) the defined threshold QoS level, the switch determination component 208 can determine that the data traffic has a relatively lower priority or criticality level for which a lower QoS can be sufficient, and accordingly, can determine that switching from the first (e.g., smaller) BWP to the second (e.g., larger) BWP is not desirable and is not to be performed, at least at this time. If, instead, the switch determination component 208 determines that the QoS level or the desired QoS level satisfies the defined threshold QoS level, the switch determination component 208 can determine that the data traffic has a higher priority or criticality level for which a higher QoS can be desirable, and accordingly, it at least potentially can be desirable to switch from the first (e.g., smaller) BWP to the second (e.g., larger) BWP (e.g., provided other conditions or applicable BWP management criteria are satisfied).

If the switch determination component 208 determines that it at least potentially can be desirable to switch from the first (e.g., smaller) BWP to the second (e.g., larger) BWP based at least in part on the characteristic value or desired characteristic value being determined to satisfy the defined threshold characteristic value, the switch determination component 208 can determine whether switching the BWP from the first BWP to the second BWP can improve (e.g., enhance, increase, or optimize) the characteristic value (e.g., to the target characteristic value, or to another improved or higher characteristic value). For instance, if a heavier level of data traffic or a higher priority level associated with the data traffic of the data session is detected by the switch determination component 208, the switch determination component 208 can determine whether switching from the first (e.g., smaller) BWP to the second (e.g., larger) BWP can improve (e.g., increase or optimize) the communication rate or the QoS level (whichever characteristic is desired to be improved). If the switch determination component 208 determines that switching from the first BWP to the second BWP can improve the communication rate or the QoS level, the switch determination component 208 can determine that it at least potentially can be desirable to switch from the first BWP to the second BWP, and, in response, the switch determination component 208, employing a timer component 210, can initiate a switching timer that can be set for a desired defined amount (e.g., length) of time (e.g., 5 seconds, 10 seconds, 20 seconds, 30 seconds, or other desired greater or lesser amount of time), in accordance with the defined BWP management criteria.

If, after the amount of time of the switching timer has elapsed, the switch determination component 208 determines that the higher characteristic value associated with the characteristic is no longer detected (e.g., because the data session was a relatively short data session that has ended), the switch determination component 208 can determine that the communication device can remain at the first (e.g., smaller) BWP and is not to be switched to utilize the second (e.g., larger) BWP, in accordance with the defined BWP management criteria. For instance, if, after the amount of time of the switching timer has elapsed, the switch determination component 208 determines that the heavier data traffic level or higher priority level associated with the data traffic is no longer detected (e.g., because the data session was a relatively short data session that has ended), the switch determination component 208 can determine that the communication device can remain at the first BWP and is not to be switched to utilize the second BWP.

If, instead, after the amount of time of the switching timer has elapsed, the switch determination component 208 determines that higher characteristic value associated with the characteristic (e.g., the heavier data traffic level or the higher priority level) is still occurring, the switch determination component 208 can determine that the communication device is to switch from utilizing the first (e.g., smaller) BWP to utilizing the second (e.g., larger) BWP, and can switch or facilitate switching of the communication device 104 from utilizing the first BWP to utilizing the second BWP. For instance, the BWP management component 130 can generate switching instructions and, employing a communicator component 212, can communicate the switching instructions to the communication device 104 to instruct the communication device 104 to switch from the first BWP to the second BWP. In response to the switching instructions, the communication device 104 can switch from the first BWP to the second BWP, and can monitor the second (e.g., larger) BWP (e.g., if the communication device 104 is operating in the frequency domain) or can perform a fuller scan of the channel bandwidth associated with the second BWP (e.g., if the communication device 104 is operating in the time domain).

In response to switching the communication device 104 to the second BWP, the switch determination component 208, employing the timer component 210, can set a switching timer (e.g., the same switching timer, or a different switching timer having a different amount of time, as specified by the defined BWP management criteria), and, after the applicable amount of time of the switching timer has elapsed, the switch determination component 208 can check (e.g., evaluate) again to determine whether the higher characteristic value associated with the characteristic (e.g., the heavier data traffic level or the higher priority level) is still occurring. If the switch determination component 208 determines that the higher characteristic value associated with the characteristic is still occurring, the switch determination component 208 can control BWP switching to continue to have the communication device 104 utilize the second (e.g., larger) BWP during the data session. During the data session, the switch determination component 208 can continue to perform such operations of setting a switching timer and performing such checks after a switching timer has elapsed to determine whether the higher characteristic value associated with the characteristic for the data session continues to be detected.

If, after a switching timer has elapsed and the switch determination component 208 performs a check, the switch determination component 208 determines that the higher characteristic value associated with the characteristic (e.g., the heavier data traffic level or the higher priority level) associated with the data session is no longer detected (e.g., because the data session has ended and/or no heavier data traffic application(s) is being used), the switch determination component 208 can determine that the communication device 104 is to switch from utilizing the second (e.g., larger) BWP to utilizing a smaller BWP (e.g., the previous smaller BWP (e.g., the first BWP) or a different but relatively smaller BWP that is smaller than the second BWP), and can switch or facilitate switching of the communication device 104 from utilizing the second (e.g., larger) BWP to utilizing the smaller BWP.

In some embodiments, the BWP management component 130 can consider power characteristics (e.g., PSM, battery power level, external power source, or other power characteristic) associated with the communication device 104 to facilitate determining whether to employ or bypass BWP switching for a communication device (e.g., 104) during a data session, in accordance with the defined BWP management criteria. For instance, even if certain characteristics (e.g., heavier data traffic level, or high QoS level) indicate that switching from a smaller BWP to a larger BWP may be desirable, if a power characteristic(s) (e.g., communication device is in PSM or has a low battery power level) indicates that it can be desirable to bypass BWP switching, the switch determination component 208 can determine that BWP switching can be bypassed and the communication device can remain in, or be switched to, utilizing the smaller BWP when doing so is specified by the defined BWP management criteria.

In certain embodiments, with regard to a data session involving communication device 104 (e.g., communicating with another communication device and/or utilizing a service and associated application), the switch determination component 208 can determine whether PSM is set to the on state on the communication device 104, based at least in part on the results of the analysis of the data relating to the operation of the communication device 104. If the switch determination component 208 determines that the PSM is set to the on state for the communication device 104, the switch determination component 208 can determine that BWP switching is to be bypassed and the communication device 104 is to continue utilizing the first (e.g., smaller) BWP for the data session (or be switched to the first BWP, if the communication device is currently utilizing a larger (e.g., second) BWP), when doing so is in accordance with (e.g., is specified by) the defined BWP management criteria.

If the switch determination component 208 determines that the PSM is not set to the on state for the communication device 104, the switch determination component 208 can determine the battery power level of the communication device 104 based at least in part on the results of the analysis of the data relating to the operation of the communication device 104. The switch determination component 208 can determine whether the battery power level of the communication device 104 is below a defined threshold battery power level that relates to BWP switching (e.g., that is applicable to facilitate determining whether BWP switching is to be bypassed), based at least in part on a result of comparing the battery power level to the defined threshold battery power level. The defined threshold battery power level can be indicated or specified by the defined BWP management criteria.

If the switch determination component 208 determines that the battery power level of the communication device 104 is at or above the defined threshold battery power level, the switch determination component 208 can determine that BWP switching can be permitted (e.g., does not have to be bypassed) for the data session (e.g., provided that any other applicable BWP management criteria for switching to a different (e.g., second or larger) BWP is satisfied). In such instance, if the switch determination component 208 determines that BWP switching can be desirable (e.g., suitable or optimal) due to a characteristic value associated with a characteristic (e.g., heavier data traffic level or high QoS level) indicating that switching from the first (e.g., smaller) BWP to the second (e.g., larger) BWP can be desirable, the switch determination component 208 can determine that BWP switching can be performed to have the communication device 104 switch from utilizing the first BWP to utilizing the second BWP, in accordance with the defined BWP management criteria.

In some embodiments, the switch determination component 208 determines that the battery power level of the communication device 104 is below the defined threshold battery power level, the switch determination component 208 can determine whether the communication device 104 is connected to an external power source (e.g., AC power from an electrical power grid; or an external battery determined to have a sufficient amount of power available). If the switch determination component 208 determines that the communication device 104 is not connected to an external power source (or is connected to an external power source, but the external power source is determined to not have a sufficient amount of power available), the switch determination component 208 can determine that BWP switching is to be bypassed at this time (e.g., for this data session) and the communication device 104 is to continue utilizing the first BWP for the data session. If, instead, the switch determination component 208 determines that the communication device 104 is connected to the external power source (and the external power source is determined to have a sufficient amount of power available), the switch determination component 208 can determine that BWP switching can be permitted (e.g., does not have to be bypassed) for the data session (e.g., provided that any other applicable BWP management criteria for switching to a different (e.g., second or larger) BWP is satisfied).

While some example embodiments are described herein involving switching between a first (e.g., smaller) BWP and a second (e.g., larger BWP), in accordance with various embodiments, the disclosed subject matter can employ a desired number (e.g., two, three, four, or more) BWPs for a communication device (e.g., when supported by the communication device and the communication network). In some embodiments, a communication device (e.g., 104) can support four BWPs, and the BWP management component 130 can manage switching between a first (e.g., smallest) BWP, second (e.g., lower medium) BWP, third (e.g., upper medium) BWP, and fourth (e.g., largest) BWP based at least in part on characteristics associated with the communication device, in accordance with the defined BWP management criteria. For example, the BWP management component 130 can manage the four BWPs to have the communication device 104 utilize the first BWP when the communication device 104 is determined to be associated with a characteristic associated with a first characteristic value (e.g., the communication device 104 is determined to be idle mode, unconnected mode, inactive mode, or sleep mode), the second BWP when the communication device 104 is determined to be associated with a characteristic associated with a second characteristic value (e.g., light level of data traffic, or low QoS level), the third BWP when the communication device 104 is determined to be associated with a characteristic associated with a third characteristic value (e.g., medium level of data traffic, or medium QoS level), or the fourth BWP when the communication device 104 is determined to be associated with a characteristic associated with a fourth characteristic value (e.g., high level of data traffic, or high QoS level). The BWP management component 130 can employ respective defined threshold characteristic values to facilitate determining whether to switch between the four BWPs. For instance, the BWP management component 130 can apply a first defined threshold characteristic value to facilitate determining whether to switch between the first BWP and the second BWP associated with the communication device 104 (e.g., switch to first BWP if the characteristic value associated with the characteristic associated with the communication device 104 is determined to be below the first defined threshold characteristic value, and switch to second BWP if the characteristic value is determined to be at or above the first defined threshold characteristic value (and below a second defined threshold characteristic value)). The BWP management component 130 can apply the second defined threshold characteristic value to facilitate determining whether to switch between the second BWP and the third BWP associated with the communication device 104 (e.g., switch to second BWP if the characteristic value is determined to be below the second defined threshold characteristic value (and at or above the first defined threshold characteristic value), and switch to the third BWP if the characteristic value is determined to be at or above the second defined threshold characteristic value (and below a third defined threshold characteristic value)). The BWP management component 130 can apply the third defined threshold characteristic value to facilitate determining whether to switch between the third BWP and the fourth BWP associated with the communication device 104 (e.g., switch to the third BWP if the characteristic value is determined to be below the third defined threshold characteristic value (and at or above the second defined threshold characteristic value), and switch to the fourth BWP if the characteristic value is determined to be at or above the third defined threshold characteristic value).

In certain embodiments, additionally or alternatively, the BWP management component 130 can manage switching a communication device 104 between utilizing the four BWPs based at least in part on the power-related characteristics associated with the communication device 104. For instance, the BWP management component 130 can manage the four BWPs to limit the communication device 104 to utilizing the first (e.g., smallest) BWP when the communication device 104 is determined to be in PSM or has a battery power level below a first defined threshold battery power level, to limit the communication device 104 to utilizing only the first BWP or the second (e.g., lower medium) BWP when the battery of the communication device 104 is determined to have a battery power level that is at or above the first defined threshold battery power level and below a second defined threshold battery power level, to limit the communication device 104 to utilizing only the first BWP, second BWP, or the third (e.g., upper medium) BWP when the battery of the communication device 104 is determined to have a battery power level that is at or above the second defined threshold battery power level and below a third defined threshold battery power level, or to allow the communication device to utilize the first BWP, the second BWP, the third BWP, or the fourth BWP when the battery of the communication device 104 is determined to have a battery power level that is at or above the third defined threshold battery power level, in accordance with the defined BWP management criteria. The BWP management component 130 can control switching of the communication device 104 between the one or more BWPs that are available (e.g., the one or more BWPs to which the communication device 104 is limited due to the battery power level), based at least in part on the battery power level of the battery of the communication device 104, and based at least in part on another characteristic value associated with another characteristic (e.g., communication rate indicative of how heavy or light the data traffic associated with the communication device 104 is, or the QoS level associated with the data traffic associated with the communication device 104) and the applicable defined threshold characteristic values, in accordance with the defined BWP management criteria.

With further regard to the configuration and use of BWPs by a communication device (e.g., 104), in some embodiments, in addition to the group of BWPs (e.g., one, two, three, four, or more BWPs) for the UL and the group of BWPs for the DL that can be utilized by the communication device, the communication device can be configured with up to an additional group of BWPs (e.g., one, two, three, four, or more BWPs) in a supplementary UL. As described herein, in certain embodiments, only one of the available BWPs in the UL and one of the available BWPs in the DL for the communication device (e.g., 104) can be active at a given time. Also, as described herein, this can mean that the communication device cannot transmit PUSCH or PUCCH and cannot receive PDSCH or PDCCH outside of an active BWP. If the communication device (e.g., 104) is configured to be able to utilize the additional group of BWPs in the supplementary UL, the communication device can be configured to utilize one particular BWP (e.g., fourth BWP) of the group of BWPs for the UL and one particular BWP (e.g., fourth BWP) of the group of BWPs for the DL, and also can be configured to utilize a same or different BWP (e.g., fourth BWP or second BWP) of the additional group of BWPs for the supplementary UL.

For example, if, based at least in part on the results of an analysis of the data traffic-related information and/or service type of a data session associated with the communication device 104 and base station 112, the BWP management component 130 determines that there is a heavier data traffic level for data traffic being communicated to the communication device 104 on the DL and a relatively lighter data traffic level for data traffic being communicated by the communication device 104 on the UL, the BWP management component 130 (e.g., the switch determination component 208) can determine that a larger BWP (e.g., fourth BWP) can be utilized for the DL, since there is a heavier data traffic level on the DL, and a relatively smaller BWP (e.g., first or second BWP) can be utilized for the supplementary UL, since there is a relatively lighter data traffic level on the UL, in accordance with the defined BWP management criteria (e.g., provided any other applicable BWP management criteria are satisfied). This can enable the communication device 104 to have a desirably (e.g., suitably, enhancedly, or optimally) larger amount of resources to handle communication of the higher amount of data traffic via the DL, while using less resources (and accordingly, less battery power of the communication device 104) to handle communication of the relatively lighter amount of data traffic via the UL (e.g., via the supplementary UL), which can save (e.g., preserve, conserve, or utilize less) resources and power, while also providing a desirably higher amount of resources on a communication channel (e.g., DL) that can utilize such higher amount of resources to achieve desirably higher quality communication (e.g., desirably fast communication rate or desirably higher QoS).

In accordance with various embodiments, the BWP management component 130 can employ respective switching timers, respective characteristic values, respective threshold characteristic values, or other respective features relating to BWP switching for respective users (e.g., user 114, user 124, or other user, on a per user basis) and/or respective communication devices (e.g., communication device 104, communication device 110, or other communication device, on a per communication device basis). For example, the BWP management component 130 can analyze data relating to respective users, respective communication devices, and/or respective data sessions. Based at least in part on the results of such analysis, the BWP management component 130 can determine a first group of switching timers, a first group of characteristic values, a first group of threshold characteristic values, and/or a first group of other features that can be utilized for the user 114 or associated communication device 104 to facilitate managing BWP switching, and can determine a second group of switching timers, a second group of characteristic values, a second group of threshold characteristic values, and/or a second group of other features that can be utilized for the user 124 or associated communication device 110 to facilitate managing BWP switching, in accordance with the defined BWP management criteria. In certain embodiments, the BWP management component 130 can employ an artificial intelligence (AI) or machine learning (ML) analysis on such data to facilitate learning, inferring, or determining respective switching timers, respective characteristic values, respective threshold characteristic values, or other respective features relating to BWP switching for respective users and/or respective communication devices, such as more fully described herein.

With further regard to the communicator component 212, the communicator component 212 can transmit information to other components or devices, and can receive information from other components or devices. For example, the communicator component 212 can transmit messages, signals, instructions, data, and/or metadata relating to selection or configuration of BWPs for communication devices (e.g., 104, 106, 108, or 110) to the communication devices and/or to other components or devices (e.g., base station 112 or other network equipment of the communication network 102) for forwarding (e.g., transmission) to the communication devices. As another example, the communicator component 212 can receive messages, signals, data, and/or metadata relating to BWPs, data traffic associated with data sessions involving communication devices (e.g., 104, 106, 108, or 110), communication conditions associated with communication devices, communication network conditions (e.g., network congestion, network resource availability, or other communication network conditions) associated with the communication network 102, applications (e.g., 116, 120, or 126), services (e.g., 118, 122, or 128), or other types of information from communication devices, network equipment, or other components or devices, respectively.

In accordance with various embodiments, the BWP management component 130 can comprise or be associated with an AI component 214 that can perform an AI and/or ML analysis on data comprising or relating to BWPs, users (e.g., user preferences of users associated with communication devices), communication devices, data traffic associated with data sessions involving communication devices (e.g., 104, 106, 108, or 110), communication conditions associated with communication devices, communication network conditions (e.g., network congestion, network resource availability, or other communication network conditions) associated with the communication network 102, applications (e.g., 116, 120, or 126), services (e.g., 118, 122, or 128), communication device location data, metadata, historical information relating thereto, or other types of information.

In some embodiments, in connection with or as part of such an AI or ML analysis, the AI component 214 can employ, build (e.g., construct or create), and/or import, AI and/or ML techniques and algorithms, AI and/or ML models, neural networks (e.g., trained neural networks), and/or graph mining to render and/or generate predictions, inferences, calculations, prognostications, estimates, derivations, forecasts, detections, and/or computations that can facilitate determining a data traffic type of data traffic associated with a data session associated with a communication device(s); a service type of a service being utilized during the data session; a characteristic value associated with a characteristic (e.g., communication rate, QoS level, or other type of characteristic value associated with the data session); a desired (e.g., improved, increased, optimal, or target) characteristic value associated with the characteristic (e.g., desired communication rate, desired QoS level, or other type of desired characteristic value associated with the data session); an amount of time to employ for a switching timer in connection with BWP switching; whether to adapt (e.g., modify, adjust, or change) an amount of time of a switching timer to a different amount of time (e.g., with regard to a user (e.g., on a per user basis) or communication device (e.g., on a per communication device basis)); whether to switch BWPs to have the communication device switch from utilizing one BWP to utilizing another BWP during the data session; a BWP of a group of BWPs to have the communication device utilize during the data session; a bandwidth size of a BWP; a sparseness level of scanning of a bandwidth by the communication device with regard to the time domain (e.g., if TDM is supported by the communication device); a battery power level of a battery of the communication device; whether the communication device is connected to an external power source; whether the external power source is from an AC power grid or is an external battery; if an external battery, a battery power level of the external battery; a defined threshold characteristic value associated with a characteristic (e.g., defined threshold communication rate, defined threshold QoS level, defined threshold battery power level, or other defined threshold characteristic value) to utilize to facilitate determining whether to switch BWPs associated with the communication device; whether to adapt a defined threshold characteristic value to a different threshold characteristic value (e.g., with regard to a user (e.g., on a per user basis) or communication device (e.g., on a per communication device basis)); making other desired determinations, such as the determinations described herein; and/or automating one or more functions or features of the disclosed subject matter (e.g., automating one or more functions or features of or associated with the BWP management component 130, a communication device, or other device or component), as more fully described herein.

As an example, based at least in part on the results of an AI or ML analysis performed on the data, the AI component 214 can learn, infer, or determine that, when the user 114 uses the communication device 104 for video streaming (e.g., using a service, such as service 118), the data traffic level is relatively high and the user 114 frequently streams video for a relatively long time (e.g., the data session is frequently relatively long). As a further result of the AI or ML analysis performed on the data, including learning, inferring, or determining that the user 114 frequently streams video for a relatively long time on the communication device 104 and the data traffic level is relatively high, the AI component 214 can learn, infer, or determine that a relatively short default or current switching timer relating to determining whether a larger BWP is to continue to be used during a data session can be adapted (e.g., modified, adjusted, or changed) to a relatively longer switching timer (e.g., the amount of time of the switching timer can be increased) at least with regard to when the user 114 is using the communication device 104 to stream video during a data session. Accordingly, when the BWP management component 130 determines that the user 114 is using the communication device 104 for video streaming, the BWP management component 130 can utilize an initial switching timer (e.g., a relatively shorter switching timer) to facilitate determining whether to switch from having the communication device 104 utilize a shorter BWP to having the communication device 104 utilize a larger BWP, and, if the video streaming data session is still ongoing after the initial switching timer has elapsed, the BWP management component 130 can have the communication device 104 switch to utilizing the larger BWP, and can initiate the adapted longer switching timer during the rest of the data session to facilitate determining whether the communication device 104 is to continue to utilize the larger BWP or is to switch back to utilizing the smaller BWP (or other smaller BWP), in accordance with the defined BWP management criteria, such as described herein.

The AI component 214 can learn, infer, or determine respective switching timers, respective characteristic values, respective threshold characteristic values, or other respective features relating to BWP switching for respective users (e.g., user 114, user 124, or other user) and/or respective communication devices (e.g., communication device 104, communication device 110, or other communication device). For instance, based at least in part on the results of an AI or ML analysis performed on the data (e.g., associated with the respective users and/or respective communication devices), the AI component 214 can learn, infer, or determine a first group of switching timers, a first group of characteristic values, a first group of threshold characteristic values, and/or a first group of other features that can be utilized for the user 114 or associated communication device 104 to facilitate managing BWP switching, and can learn, infer, or determine a second group of switching timers, a second group of characteristic values, a second group of threshold characteristic values, and/or a second group of other features that can be utilized for the user 124 or associated communication device 110 to facilitate managing BWP switching.

In some embodiments, when more than one user utilizes the same communication device (e.g., 104), based at least in part on the AI or ML analysis results, the AI component 214 can learn, infer, or determine respective switching timers, respective characteristic values, respective threshold characteristic values, or other respective features relating to BWP switching for the respective users who are using the same communication device. The BWP management component 130 can determine which of the respective switching timers, respective characteristic values, respective threshold characteristic values, or other respective features to utilize for the communication device (e.g., 104) based at least in part on which user is determined to be using the communication device at a particular time.

The AI component 214 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 214 can examine the entirety or a subset of the data (e.g., data associated with data sessions, communication devices, or users; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In some embodiments, the BWP management component 130 also can comprise an operations manager component 216 that can control (e.g., manage) operations associated with the BWP management component 130. For example, the operations manager component 216 can facilitate generating instructions to have components of the BWP management component 130 perform operations, and can communicate respective instructions to respective components (e.g., device capability identifier component 202, network configuration identifier component 204, characteristic component 206, switch determination component 208, timer component 210, communicator component 212, AI component 214, processor component 218, and data store 220) of the BWP management component 130 to facilitate performance of operations by the respective components of the BWP management component 130 based at least in part on the instructions, in accordance with the defined BWP management criteria and BWP management algorithms or other algorithms (e.g., BWP management algorithms, AI or machine learning algorithms, or other algorithms, as disclosed, defined, recited, or indicated herein by the methods, systems, and techniques described herein). The operations manager component 216 also can facilitate controlling data flow between the respective components of the BWP management component 130 and controlling data flow between the BWP management component 130 and another component(s) or device(s) (e.g., a communication device, a base station or other network component, equipment, or device of the communication network, data sources, applications, or other type of component or device) associated with (e.g., connected to) the BWP management component 130.

In certain embodiments, the BWP management component 130 can comprise a processor component 218 that can work in conjunction with the other components (e.g., device capability identifier component 202, network configuration identifier component 204, characteristic component 206, switch determination component 208, timer component 210, communicator component 212, AI component 214, operations manager component 216, and data store 220) to facilitate performing the various functions of the BWP management component 130. The processor component 218 can employ one or more processors, microprocessors, or controllers that can process data, such as information relating to BWPs, BWP switching, BWP types, channel bandwidths, frequency bands, users, user preferences of users, communication devices, switching timers, battery power associated with communication devices, threshold values (e.g., defined threshold characteristic values, defined threshold communication rate, defined threshold QoS level, defined threshold battery power level, defined threshold amount of time, or other threshold value), characteristics (e.g., communication rates, QoS levels, battery power levels, or other characteristic) associated with communication devices, communication conditions associated with communication devices, network configuration of the communication network, network conditions associated with the communication network, messages, device identifiers associated with communication devices, authentication credentials associated with communication devices, metadata, parameters, traffic flows, policies, defined BWP management criteria, algorithms (e.g., BWP management algorithms, AI or machine learning algorithms, or other algorithms, as disclosed, defined, recited, or indicated herein by the methods, systems, and techniques described herein), protocols, interfaces, tools, and/or other information, to facilitate operation of the BWP management component 130, as more fully disclosed herein, and control data flow between the BWP management component 130 and other components (e.g., a communication device, a base station or other network component or device of the communication network, data sources, applications, or other type of component or device) associated with the BWP management component 130.

The data store 220 can store data structures (e.g., user data, metadata), code structure(s) (e.g., modules, objects, hashes, classes, procedures) or instructions, information relating to BWPs, BWP switching, BWP types, channel bandwidths, frequency bands, users, user preferences of users, communication devices, switching timers, battery power associated with communication devices, threshold values (e.g., defined threshold characteristic values, defined threshold communication rate, defined threshold QoS level, defined threshold battery power level, defined threshold amount of time, or other threshold value), characteristics (e.g., communication rates, QoS levels, battery power levels, or other characteristic) associated with users, communication devices, communication conditions associated with communication devices, network configuration of the communication network, network conditions associated with the communication network, messages, device identifiers associated with communication devices, authentication credentials associated with communication devices, metadata, parameters, traffic flows, policies, defined BWP management criteria, algorithms (e.g., BWP management algorithms, AI or machine learning algorithms, or other algorithms, as disclosed, defined, recited, or indicated herein by the methods, systems, and techniques described herein), protocols, interfaces, tools, and/or other information, to facilitate controlling operations associated with the BWP management component 130. In an aspect, the processor component 218 can be functionally coupled (e.g., through a memory bus) to the data store 220 in order to store and retrieve information desired to operate and/or confer functionality, at least in part, to the device capability identifier component 202, network configuration identifier component 204, characteristic component 206, switch determination component 208, timer component 210, communicator component 212, AI component 214, operations manager component 216, data store 220, or other component, and/or substantially any other operational aspects of the BWP management component 130.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Described herein are systems, methods, articles of manufacture, and other embodiments or implementations that can facilitate detecting and mitigating aggressive and/or malicious communication devices, and associated aggressive and/or malicious events, against a RAN of a communication network, and managing attachment, registration, or connection of communication devices to the RAN or communication network, as more fully described herein. The detecting and mitigating of aggressive and/or malicious communication devices, and associated aggressive and/or malicious events against a RAN and/or communication network, managing of attachment, registration, or connection of communication devices to the RAN or communication network, and/or other features of the disclosed subject matter, can be implemented in connection with any type of device with a connection to, or attempting to connect to, the communication network (e.g., a wireless or mobile device, a computer, a handheld device, or other device), any Internet of things (IoT) device (e.g., health monitoring device, toaster, coffee maker, blinds, music players, speakers, or other IoT device), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, or other type of device. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/ or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) or other type of radio network node.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 6:
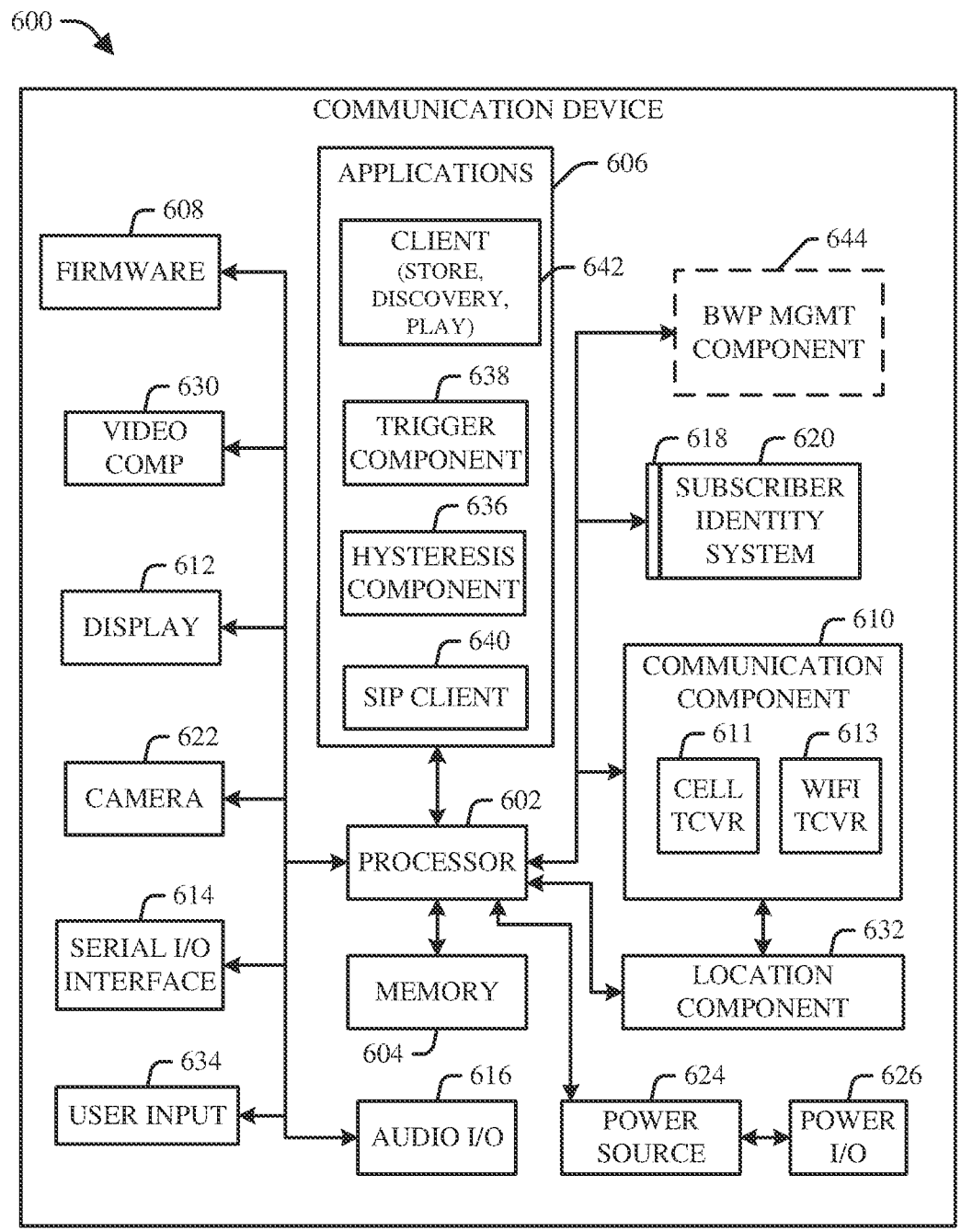
FIG. 6 depicts a block diagram of example communication device, in accordance with various aspects and embodiments of the disclosed subject matter.

Referring now to FIG. 6, depicted is an example block diagram of an example communication device 600 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 600 can include a processor 602 for controlling and processing all onboard operations and functions. A memory 604 interfaces to the processor 602 for storage of data and one or more applications 606 (e.g., a video player software, user feedback component software, or other type of application). Other applications can include voice recognition of predetermined voice commands that facilitate initiation of the user feedback signals. The applications 606 can be stored in the memory 604 and/or in a firmware 608, and executed by the processor 602 from either or both the memory 604 or/and the firmware 608. The firmware 608 can also store startup code for execution in initializing the communication device 600. A communication component 610 interfaces to the processor 602 to facilitate wired/wireless communication with external systems, e.g., cellular networks, VoIP networks, and so on. Here, the communication component 610 can also include a suitable cellular transceiver 611 (e.g., a GSM transceiver) and/or an unlicensed transceiver 613 (e.g., Wi-Fi, WiMax) for corresponding signal communications. The communication device 600 can be a device such as a cellular telephone, a PDA with mobile communications capabilities, and messaging-centric devices. The communication component 610 also facilitates communications reception from terrestrial radio networks (e.g., broadcast), digital satellite radio networks, and Internet-based radio services networks.

The communication device 600 includes a display 612 for displaying text, images, video, telephony functions (e.g., a Caller ID function), setup functions, and for user input. For example, the display 612 can also be referred to as a "screen" that can accommodate the presentation of multimedia content (e.g., music metadata, messages, wallpaper, graphics, or other content). The display 612 can also display videos and can facilitate the generation, editing and sharing of video quotes. A serial I/O interface 614 is provided in communication with the processor 602 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 600, for example. Audio capabilities are provided with an audio I/O component 616, which can include a speaker for the output of audio signals related to, for example, indication that the user pressed the proper key or key combination to initiate the user feedback signal. The audio I/O component 616 also facilitates the input of audio signals through a microphone to record data and/or telephony voice data, and for inputting voice signals for telephone conversations.

The communication device 600 can include a slot interface 618 for accommodating a SIC (Subscriber Identity Component) in the form factor of a card Subscriber Identity Module (SIM) or universal SIM 620, and interfacing the SIM card 620 with the processor 602. However, it is to be appreciated that the SIM card 620 can be manufactured into the communication device 600, and updated by downloading data and software.

The communication device 600 can process IP data traffic through the communication component 610 to accommodate IP traffic from an IP network such as, for example, the Internet, a corporate intranet, a home network, a person area network, or other network, through an ISP or broadband cable provider. Thus, VoIP traffic can be utilized by the communication device 600 and IP-based multimedia content can be received in either an encoded or a decoded format.

A video processing component 622 (e.g., a camera) can be provided for decoding encoded multimedia content. The video processing component 622 can aid in facilitating the generation, editing, and sharing of video quotes. The communication device 600 also includes a power source 624 in the form of batteries and/or an AC power subsystem, which power source 624 can interface to an external power system or charging equipment (not shown) by a power I/O component 626.

The communication device 600 can also include a video component 630 for processing video content received and, for recording and transmitting video content. For example, the video component 630 can facilitate the generation, editing and sharing of video quotes. A location tracking component 632 facilitates geographically locating the communication device 600. As described hereinabove, this can occur when the user initiates the feedback signal automatically or manually. A user input component 634 facilitates the user initiating the quality feedback signal. The user input component 634 can also facilitate the generation, editing and sharing of video quotes. The user input component 634 can include such conventional input device technologies such as a keypad, keyboard, mouse, stylus pen, and/or touch screen, for example.

Referring again to the applications 606, a hysteresis component 636 facilitates the analysis and processing of hysteresis data, which is utilized to determine when to associate with the access point. A software trigger component 638 can be provided that facilitates triggering of the hysteresis component 636 when the Wi-Fi transceiver 613 detects the beacon of the access point. A SIP client 640 enables the communication device 600 to support SIP protocols and register the subscriber with the SIP registrar server. The applications 606 can also include a client 642 that provides at least the capability of discovery, play and store of multimedia content, for example, music.

The communication device 600, as indicated above related to the communication component 610, can include an indoor network radio transceiver 613 (e.g., Wi-Fi transceiver). This function supports the indoor radio link, such as IEEE 802.11, for the dual-mode GSM device (e.g., communication device 600). The communication device 600 can accommodate at least satellite radio services through a device (e.g., handset device) that can combine wireless voice and digital radio chipsets into a single device (e.g., single handheld device).

In some embodiments, the communication device 600 can comprise (e.g., optionally can comprise) a BWP management component 644 that can manage (e.g., control) switching between BWPs (e.g., first BWP, second BWP, third BWP, fourth BWP, and/or other BWP) associated with the communication device 600 with regard to the UL, DL, and/or supplementary UL, in accordance with the defined BWP management criteria, such as more fully described herein.

Figure 7:
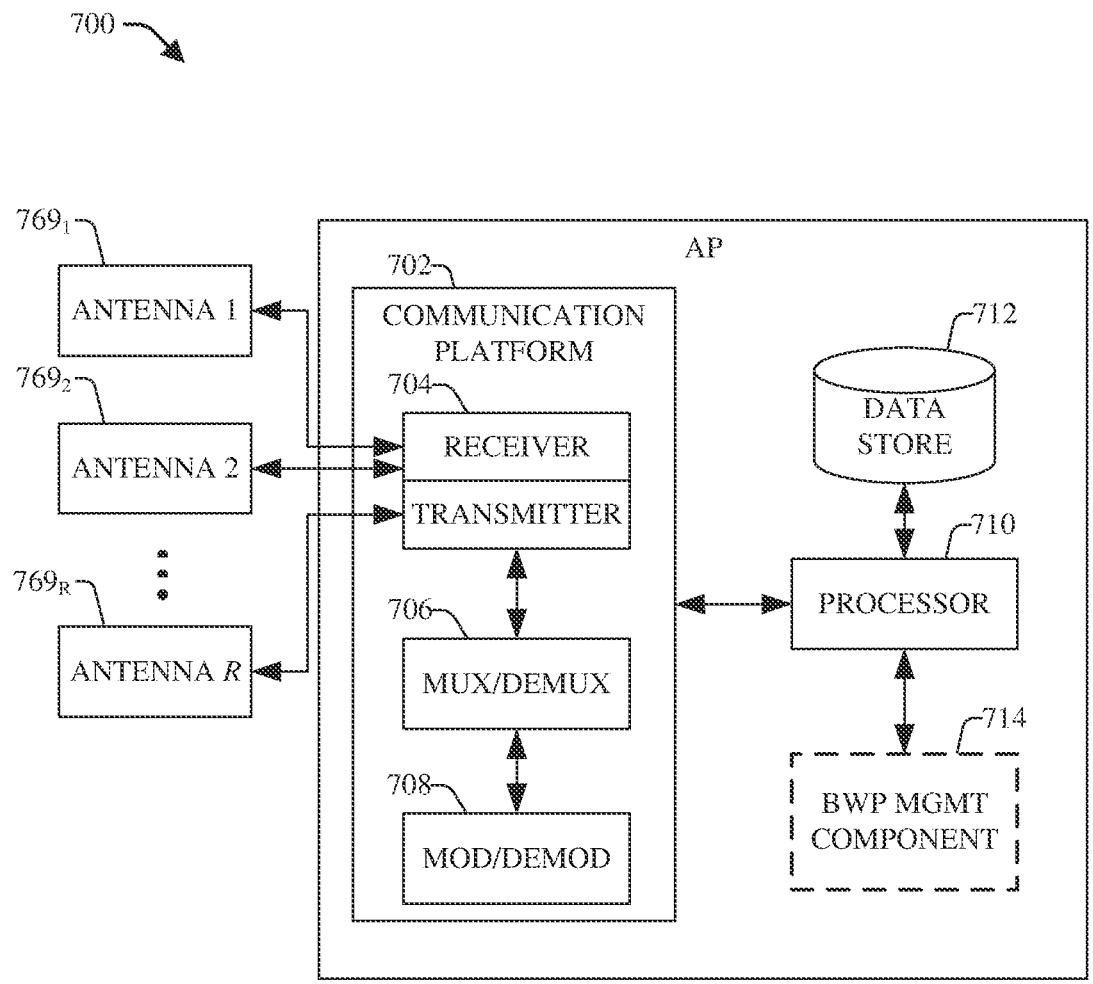
FIG. 7 illustrates a block diagram of an example access point, in accordance with various aspects and embodiments of the disclosed subject matter.

FIG. 7 illustrates a block diagram of an example access point (AP) 700 (e.g., macro base station, femto AP, pico AP, Wi-Fi AP, Wi-Fi-direct AP, or other type of AP), in accordance with various aspects and embodiments of the disclosed subject matter. The AP 700 can receive and transmit signal(s) from and to wireless devices like access points (e.g., base stations, femtocells, picocells, or other type of AP), access terminals (e.g., UEs), wireless ports and routers, and the like, through a set of antennas $769_1$-$769_R$. In an aspect, the antennas $769_1$-$769_R$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 700 can include a data store 712 that can store data structures; code instructions; rate coding information; information relating to measurement of radio link quality or reception of information related thereto; information relating to communication conditions (e.g., signal-to-interference-plus-noise ratio (SINR), reference signal received power (RSRP), reference signal received quality (RSRQ), channel quality indicator (CQI), and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold QoS values, or other type of threshold value), metadata, parameters, traffic flows, policies, rules, signaling, defined network security criteria, network security algorithms, protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 710 can be coupled to the data store 712 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined QoS values, or other type of threshold value), metadata, parameters, traffic flows, policies, rules, signaling, defined network security criteria, network security algorithms, protocols, interfaces, tools, and/or other information that can be desired to operate and/or confer functionality to the communication platform 702 and/or other operational components of AP 700.

In some embodiments, the AP 700 can comprise a BWP management component 714 that can manage (e.g., control) switching between BWPs (e.g., first BWP, second BWP, third BWP, fourth BWP, and/or other BWP) associated with communication devices with regard to the UL, DL, and/or supplementary UL, in accordance with the defined BWP management criteria, such as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 8:
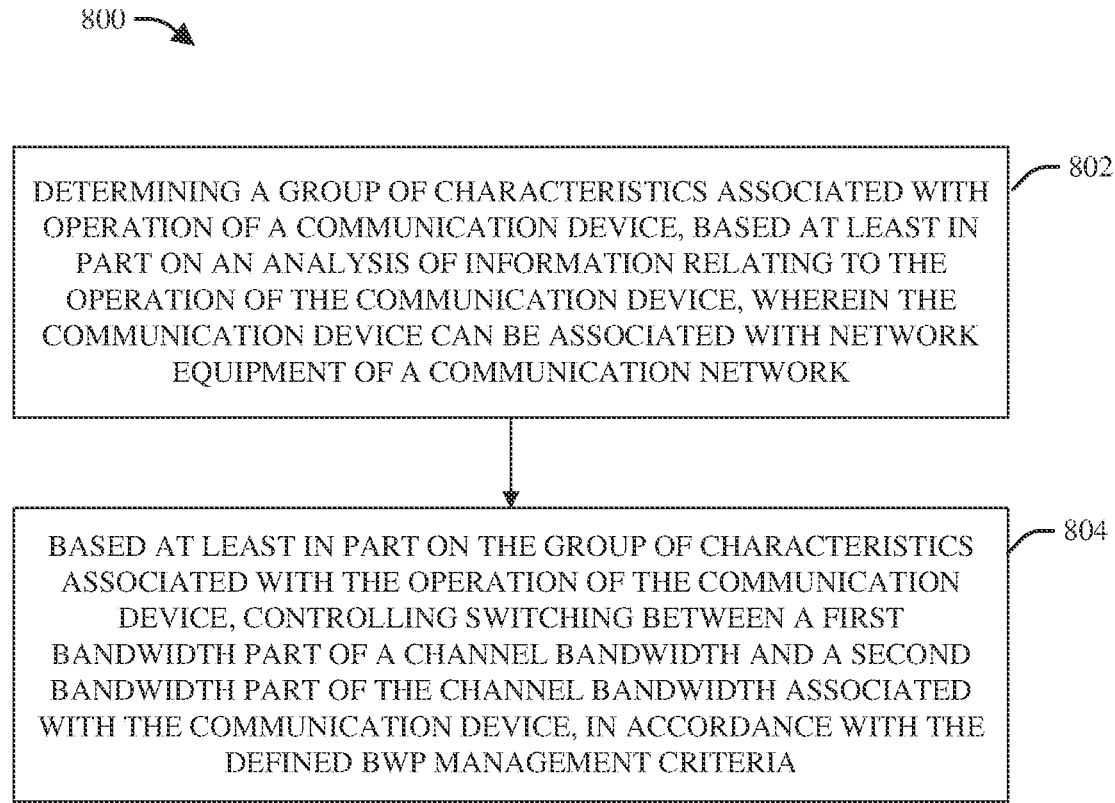
FIG. 8 illustrates a flow chart of an example method that can manage BWP switching associated with a communication device, in accordance with various aspects and embodiments of the disclosed subject matter.

FIG. 8 illustrates a flow chart of an example method 800 that can manage BWP switching associated with a communication device, in accordance with various aspects and embodiments of the disclosed subject matter. The method 800 can be employed by, for example, a system comprising the BWP management component, a processor component (e.g., of or associated with the BWP management component), and/or a data store (e.g., of or associated with the BWP management component).

At 802, a group of characteristics associated with operation of a communication device can be determined, based at least in part on an analysis of information relating to the operation of the communication device, wherein the communication device can be associated with network equipment of a communication network. The communication device can establish a data session to facilitate utilizing a service provided by an application (e.g., via another communication device). The BWP management component can analyze information (e.g., device-related information, traffic-related information, network-related information, service-related information, and/or other information) relating to the operation of the communication device. Based at least in part on the analysis results, the BWP management component can determine a group of characteristics associated with the operation of the communication device. The group of characteristics can relate to, for example, a communication rate associated with the data session between the communication device and the other device (e.g., an application and associated service provided via the other device), QoS associated with the data session, and/or device power of or associated with the communication device.

At 804, based at least in part on the group of characteristics associated with the operation of the communication device, switching between a first bandwidth part of a channel bandwidth and a second bandwidth part of the channel bandwidth associated with the communication device can be controlled, in accordance with the defined BWP management criteria. For instance, based at least in part on the group of characteristics associated with the operation of the device, the BWP management component can control switching between the first (e.g., smaller) bandwidth part and the second (e.g., larger) bandwidth part of the channel bandwidth associated with the communication device, in accordance with the defined BWP management criteria, such as more fully described herein. If operating in the frequency domain (e.g., if FDM is supported), the second BWP can comprise a larger portion of the channel bandwidth than the first BWP, and, if the communication device is switched to the second BWP, the communication device can monitor the second BWP, instead of monitoring only the first BWP; or, if operating in the time domain (e.g., if TDM is supported), the second BWP can involve a fuller scan of the channel bandwidth than the sparse scan of the channel bandwidth of the first BWP, and, if the communication device is switched to the second BWP, the communication device can perform a fuller scan of the channel bandwidth that is associated with the second BWP, instead of performing a relatively sparser scan of the channel bandwidth that is associated with the first BWP.

Figure 9:
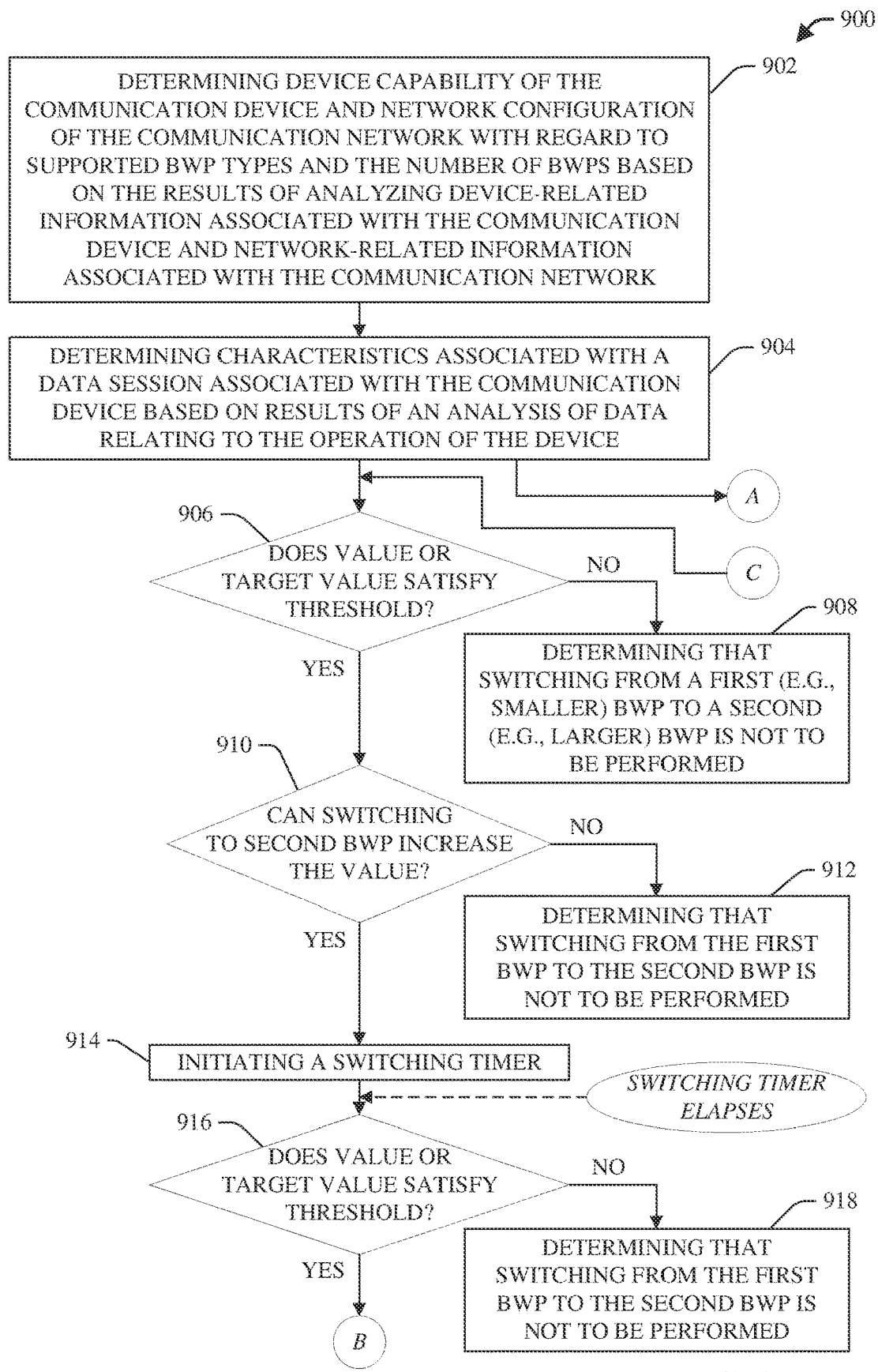
FIGS. 9 and 10 depict a flow chart of another example method that can manage BWP switching associated with a communication device, in accordance with various aspects and embodiments of the disclosed subject matter.
Figure 10:
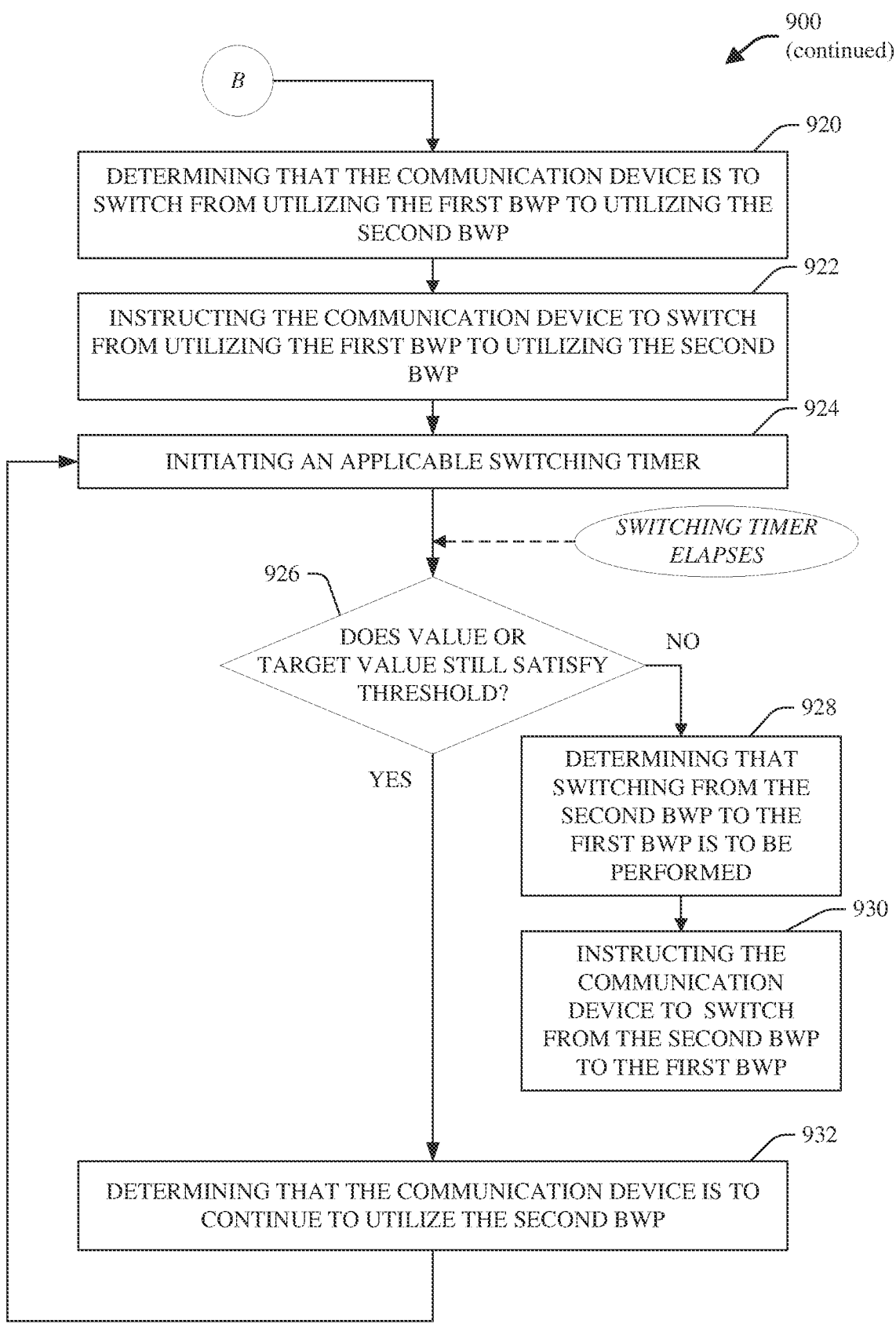

FIGS. 9 and 10 depict a flow chart of another example method 900 that can manage BWP switching associated with a communication device, in accordance with various aspects and embodiments of the disclosed subject matter. The method 900 can be employed by, for example, a system comprising the BWP management component, a processor component (e.g., of or associated with the BWP management component), and/or a data store (e.g., of or associated with the BWP management component).

In some embodiments, the communication device can be camping on a frequency band (e.g., SA n77 frequency band, mmWave frequency band, or other desired frequency band). A data session (e.g., a phone call, a message communication, video streaming session, or other call or data session) can be set up on the frequency band between the communication device and a base station of the communication network.

At 902, device capability of the communication device and network configuration of the communication network with regard to supported BWP types and the number of BWPs can be determined based at least in part on the results of analyzing device-related information associated with the communication device and network-related information associated with the communication network. The BWP management component can analyze the device-related information and the network-related information, and, based at least in part on the results of such analysis, the BWP management component can determine the device capability of the communication device and the network configuration of the communication network with regard to supported BWP types (e.g., FDM or TDM) and the number of BWPs.

At 904, characteristics associated with a data session associated with the communication device can be determined based at least in part on results of an analysis of data relating to the operation of the device, including service-related data relating to a service type of a service used by the device or traffic-related data relating to a data traffic type of data communicated between the communication device and another device during the data session. The BWP management component can determine one or more characteristics associated with the data session based at least in part on the results of the analysis of the data (e.g., service-related data, traffic-related data, or other data) relating to the operation of the communication device. The one or more characteristics can relate to, for example, a communication rate associated with the data session between the communication device and the other device (e.g., an application and associated service provided via the other device), QoS associated with the data session, or device power of the communication device.

For instance, based at least in part on the analysis results, the BWP management component can determine the service type of the service, the traffic type of the data traffic, the communication rate of the communication of the data traffic between the communication device and the communication network during the data session, QoS of the data session, whether PSM is set to the on state on the communication device, a battery power level of a battery of the communication device, whether the communication device is connected to an external power source, and/or another characteristic associated with operation of the communication device. With regard to the characteristics (e.g., service type, traffic type, or communication rate), and based at least in part on the analysis results, the BWP management component can determine whether the data session involves a heavier level of data traffic (e.g., video streaming, video call, electronic gaming, or other type of heavier level data traffic) or a lighter level of data traffic (e.g., text message, email browsing, idle mode, or other type of lighter level data traffic), the current communication rate or a desired (e.g., increased, improved, or target) communication rate, a current QoS or a desired (e.g., increased, improved, or target) QoS, a priority level of the data traffic or the service, a current PSM setting of the communication device, and/or a current battery power level of the communication device.

In some embodiments, at this point, the method 900 can proceed to reference point A, wherein method 1100 can proceed from reference point A, to determine whether bypassing BWP switching to switch to a larger BWP is desirable based at least in part on power-related characteristics associated with the communication device, such as described herein.

At 906 (if, as part of the method 1100, it is determined that bypassing BWP switching to switch to the larger BWP based on a power-related characteristic(s) is not desirable), a determination can be made regarding whether a value or a target value associated with a characteristic satisfies a defined threshold value associated with the characteristic. The BWP management component can determine whether the value (e.g., current communication rate or QoS level) or the target value (e.g., improved, increased, or target communication rate or QoS level) associated with the characteristic satisfies the defined threshold value based at least in part on the results of analyzing the service type, the traffic type, and/or the value associated with the characteristic. For example, if the characteristic relates to the communication rate, and if the current communication rate or the target communication rate satisfies (e.g., meets or exceeds; is at or greater than) the defined threshold communication rate, this can indicate that the data traffic associated with the service (e.g., for the application running on the communication device) is at a heavier level (e.g., a higher amount or volume) and/or can indicate that the data traffic relates to video streaming, a video call, electronic gaming, or other heavier traffic level type of service or application. If, instead, the current communication rate or the target communication rate does not satisfy (e.g., is lower or less than) the defined threshold communication rate, this can indicate that the data traffic is at a relatively lighter level (e.g., a relatively lighter or lower amount or volume) and/or can indicate that the data traffic relates to a text message, email browsing, or other lighter traffic level type of service or application.

If it is determined that the value or target value does not satisfy the defined threshold value, at 908, a determination can be made that switching from a first (e.g., smaller) BWP to a second (e.g., larger) BWP for the communication device is not to be performed. If the BWP management component determines that the value and/or target value (e.g., the target value; or the target value and the value) does not satisfy the defined threshold value, the BWP management component can determine that switching from the first (e.g., smaller) BWP to the second (e.g., larger) BWP for the communication device is not to be performed (e.g., at least at this time). The BWP management component can continue to have the communication device utilize the first BWP (e.g., at least at this time).

If, instead, at 906, it is determined that the value or target value satisfies the defined threshold value, at 910, a determination can be made regarding whether switching from the first BWP to the second BWP can increase the value associated with the characteristic. If the BWP management component determines that the value or target value satisfies the defined threshold value, the BWP management component can determine whether switching from the first BWP to the second BWP for the communication device can increase the value associated with the characteristic, based at least in part on the results of the analyzing of the data (e.g., service-related data, traffic-related data, or other data) relating to the operation of the communication device.

If it is determined that switching from the first BWP to the second BWP for the communication device will not increase, or is not expected to increase, the value associated with the characteristic, at 912, a determination can be made that switching from the first BWP to the second BWP for the communication device is not to be performed. If the BWP management component determines that switching from the first BWP to the second BWP for the communication device will not increase, or is not expected to increase, the value associated with the characteristic, the BWP management component can determine that switching from the first BWP to the second BWP for the communication device is not to be performed.

If, instead, at 910, it is determined that switching from the first BWP to the second BWP for the communication device can increase the value associated with the characteristic, at 914, a switching timer can be initiated. If the BWP management component determines that switching from the first BWP to the second BWP for the communication device can increase (e.g., at least can be expected to increase) the value associated with the characteristic, the BWP management component can initiate a switching timer, which can be set of a defined amount of time.

At 916, after the defined amount of time of the switching timer has elapsed, a determination can be made regarding whether the value or target value still satisfies the defined threshold value. After the defined amount of time has elapsed, the BWP management component can determine whether the value or target value still satisfies the defined threshold value. This can indicate whether the communication device is still communicating at a heavier data traffic level or whether the data session has ended (e.g., whether the data session was a relatively short data session that has ended).

If, after the defined amount of time elapsed, it is determined that the value or target value no longer satisfies the defined threshold value, at 918, a determination can be made that switching from the first BWP to the second BWP for the communication device is not to be performed. If, after the defined amount of time elapsed, the BWP management component determines that the value or target value no longer satisfies the defined threshold value, the BWP management component can determine that switching from the first BWP to the second BWP for the communication device is not to be performed.

If, instead, at 916, after the defined amount of time elapsed, it is determined that the value or target value still satisfies the defined threshold value, the method 900 can proceed to reference point B, wherein, as depicted in FIG. 10, the method 900 can proceed from reference point B to reference numeral 920, wherein at 920, a determination can be made that the communication device is to switch from utilizing the first BWP to utilizing the second BWP. If, after the defined amount of time elapsed, the BWP management component determines that the value or target value still satisfies the defined threshold value, the BWP management component can determine that the communication device is to switch from utilizing the first BWP to utilizing the second BWP.

At 922, the communication device can be instructed to switch from utilizing the first BWP to utilizing the second BWP. The BWP management component can instruct (e.g., via instructions) the communication device to switch from utilizing the first BWP to utilizing the second BWP. If operating in the frequency domain (e.g., if FDM is supported), the second BWP can comprise a larger portion of the channel bandwidth than the first BWP, and the communication device can monitor the second BWP, instead of monitoring only the first BWP; or, if operating in the time domain (e.g., if TDM is supported), the second BWP can involve a fuller scan of the channel bandwidth than the sparse scan of the channel bandwidth of the first BWP, and the communication device can perform a fuller scan of the channel bandwidth that is associated with the second BWP, instead of performing a relatively sparser scan of the channel bandwidth that is associated with the first BWP.

At 924, an applicable switching timer can be initiated. In response to the communication device being instructed to switch from utilizing the first BWP to utilizing the second BWP, and the communication device switching from utilizing the first BWP to utilizing the second BWP, the BWP management component can initiate the applicable switching timer, which can have a same or different (e.g., greater or less than) defined amount of time as the previous switching timer, in accordance with the defined BWP management criteria.

At 926, after the applicable (e.g., same or different) defined amount of time of the switching timer has elapsed, a determination can be made regarding whether the value or target value still satisfies the defined threshold value. After the applicable defined amount of time has elapsed, the BWP management component can determine whether the value or target value still satisfies the defined threshold value. This can indicate whether the communication device is still communicating at a heavier data traffic level or whether the data session has ended.

If, after the applicable defined amount of time elapsed, it is determined that the value or target value no longer satisfies the defined threshold value, at 928, a determination can be made that switching from the second BWP to the first BWP (or another lower BWP) for the communication device can be performed. If, after the applicable defined amount of time elapsed, the BWP management component determines that the value or target value no longer satisfies the defined threshold value, the BWP management component can determine that the data session has ended, and switching from the second BWP to the first BWP (or another lower BWP) for the communication device can be performed.

At 930, the communication device can be instructed to switch from utilizing the second BWP to utilizing the first BWP (or another lower BWP). The BWP management component can instruct (e.g., via instructions) the communication device to switch from utilizing the second BWP to utilizing the first BWP (or another lower BWP).

Referring again to reference numeral 926, if, instead, at 926, after the applicable defined amount of time elapsed, it is determined that the value or target value still satisfies the defined threshold value, at 932, a determination can be made that the communication device is to continue to utilize the second BWP. If, after the applicable defined amount of time elapsed, the BWP management component determines that the value or target value still satisfies the defined threshold value, the BWP management component can determine that the communication device is to continue to utilize the second BWP. At this point, the method 900 can return to reference numeral 924, wherein another switching timer can be initiated, and the method 900 can proceed from that point.

Figure 11:
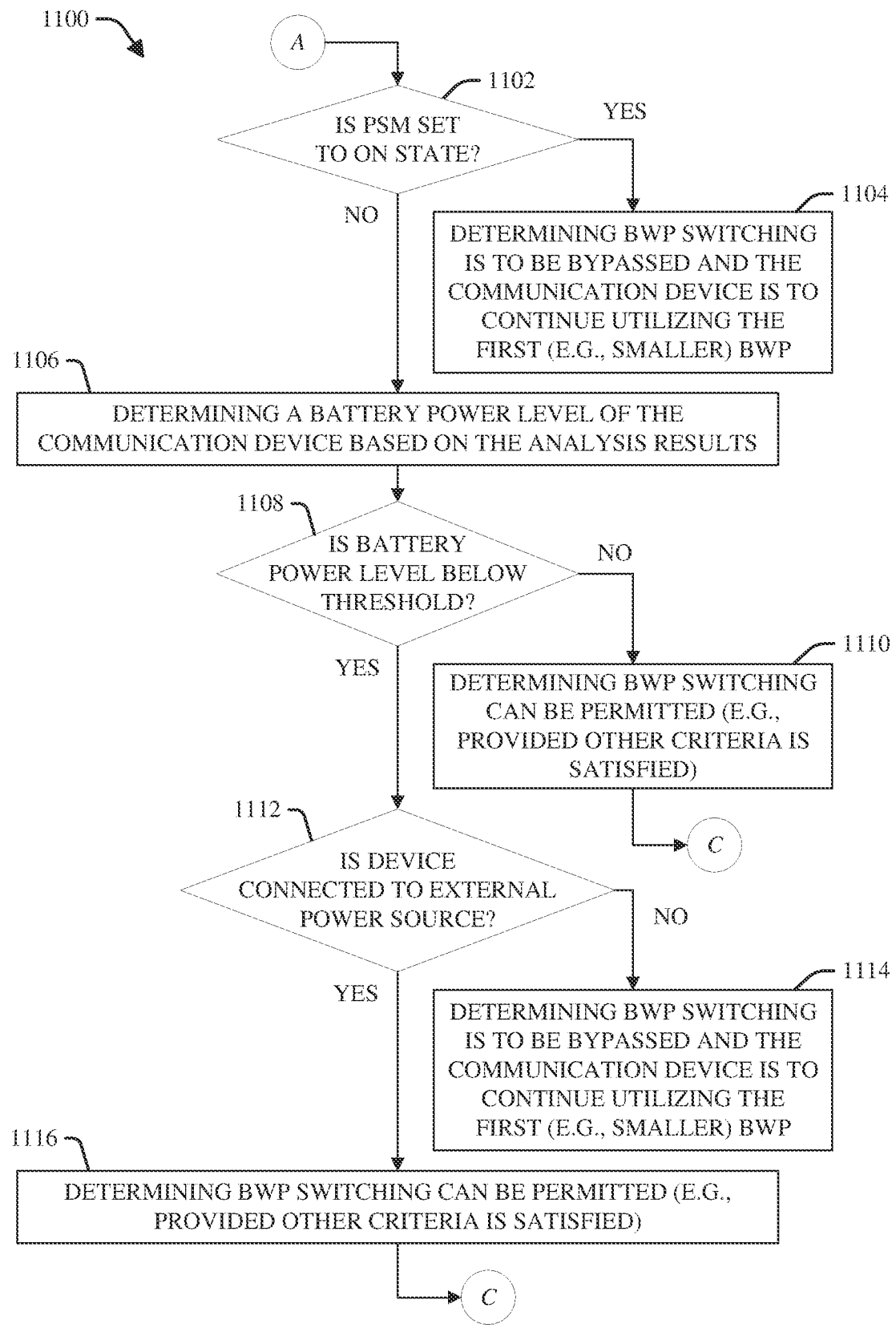
FIG. 11 illustrates a flow chart of an example method that can consider and evaluate power-related characteristics associated with a communication device to facilitate managing BWP switching associated with the communication device, in accordance with various aspects and embodiments of the disclosed subject matter.

FIG. 11 illustrates a flow chart of an example method 1100 that can consider and evaluate power-related characteristics associated with a communication device to facilitate managing BWP switching associated with the communication device, in accordance with various aspects and embodiments of the disclosed subject matter. The method 1100 can be employed by, for example, a system comprising the BWP management component, a processor component (e.g., of or associated with the BWP management component), and/or a data store (e.g., of or associated with the BWP management component). In some embodiments, the method 1100 can proceed from reference point A of the method 900, as shown in FIG. 9.

At 1102, a determination can be made regarding whether PSM is set to the on state on the communication device, based at least in part on the results of the analysis of the data relating to the operation of the communication device. The BWP management component can determine whether PSM is set to the on state on the communication device, based at least in part on the analysis results.

If it is determined that the PSM is set to the on state, at 1104, a determination can be made that BWP switching is to be bypassed and the communication device is to continue utilizing the first (e.g., smaller) BWP. If the BWP management component determines that the PSM is set to the on state, the BWP management component can determine that BWP switching is to be bypassed and the communication device is to continue utilizing the first BWP for the data session.

Referring again to reference numeral 1102, if, instead, at 1102, it is determined that the PSM is not set to the on state (e.g., is set to the off state), at 1106, a battery power level of the communication device can be determined based at least in part on the analysis results. If the BWP management component determines that the PSM is not set to the on state, the BWP management component can determine the battery power level of the communication device based at least in part on the analysis results.

At 1108, a determination can be made regarding whether the battery power level of the communication device is below a defined threshold battery power level that relates to BWP switching. The BWP management component can determine whether the battery power level is below the defined threshold battery power level that relates to BWP switching (e.g., that is applicable to facilitate determining whether BWP switching is to be bypassed), based at least in part on a result of comparing the battery power level to the defined threshold battery power level.

If it is determined that the battery power level is not below (e.g., is at or above) the defined threshold battery power level, at 1110, a determination can be made that BWP switching can be permitted (e.g., provided that any other applicable BWP management criteria for BWP switching is satisfied). If the BWP management component determines that the battery power level of the communication device is at or above the defined threshold battery power level, the BWP management component can determine that BWP switching can be permitted (e.g., does not have to be bypassed) for the data session (e.g., provided that any other applicable BWP management criteria for BWP switching is satisfied). At this point, the method 1100 can proceed to reference point C, wherein the method 900 of FIGS. 9 and 10 can proceed from reference point C to reference numeral 906, wherein the method 900 can continue from that point to determine whether BWP switching is to be performed to have the communication device switch from utilizing the first BWP to utilizing the second BWP.

Referring again to reference numeral 1108, if, instead, at 1108, it is determined that the battery power level is below the defined threshold battery power level, at 1112, a determination can be made regarding whether the communication device is connected to an external power source. If the BWP management component determines that the battery power level is below the defined threshold battery power level, the BWP management component can determine whether the communication device is connected to the external power source (e.g., AC power from an electrical power grid; or an external battery determined to have a sufficient amount of power available).

If it is determined that the communication device is not connected to an external power source (or is connected to an external power source, but the external power source is determined to not have a sufficient amount of power available), at 1114, a determination can be made that BWP switching is to be bypassed and the communication device is to continue utilizing the first BWP. If the BWP management component determines that the communication device is not connected to an external power source (or is connected to an external power source, but the external power source is determined to not have a sufficient amount of power available), the BWP management component can determine that BWP switching is to be bypassed and the communication device is to continue utilizing the first BWP for the data session.

Referring again to reference numeral 1112, if, instead, at 1112, it is determined that the communication device is connected to the external power source (and the external power source is determined to have a sufficient amount of power available), at 1116, a determination can be made that BWP switching can be permitted (e.g., provided that any other applicable BWP management criteria for BWP switching is satisfied). If the BWP management component determines that the communication device is connected to the external power source (and the external power source is determined to have a sufficient amount of power available), the BWP management component can determine that BWP switching can be permitted (e.g., does not have to be bypassed) for the data session (e.g., provided that any other applicable BWP management criteria for BWP switching is satisfied). At this point, the method 1100 can proceed to reference point C, wherein the method 900 of FIGS. 9 and 10 can proceed from reference point C to reference numeral 906, wherein the method 900 can continue from that point to determine whether BWP switching is to be performed to have the communication device switch from utilizing the first BWP to utilizing the second BWP.

Figure 12:
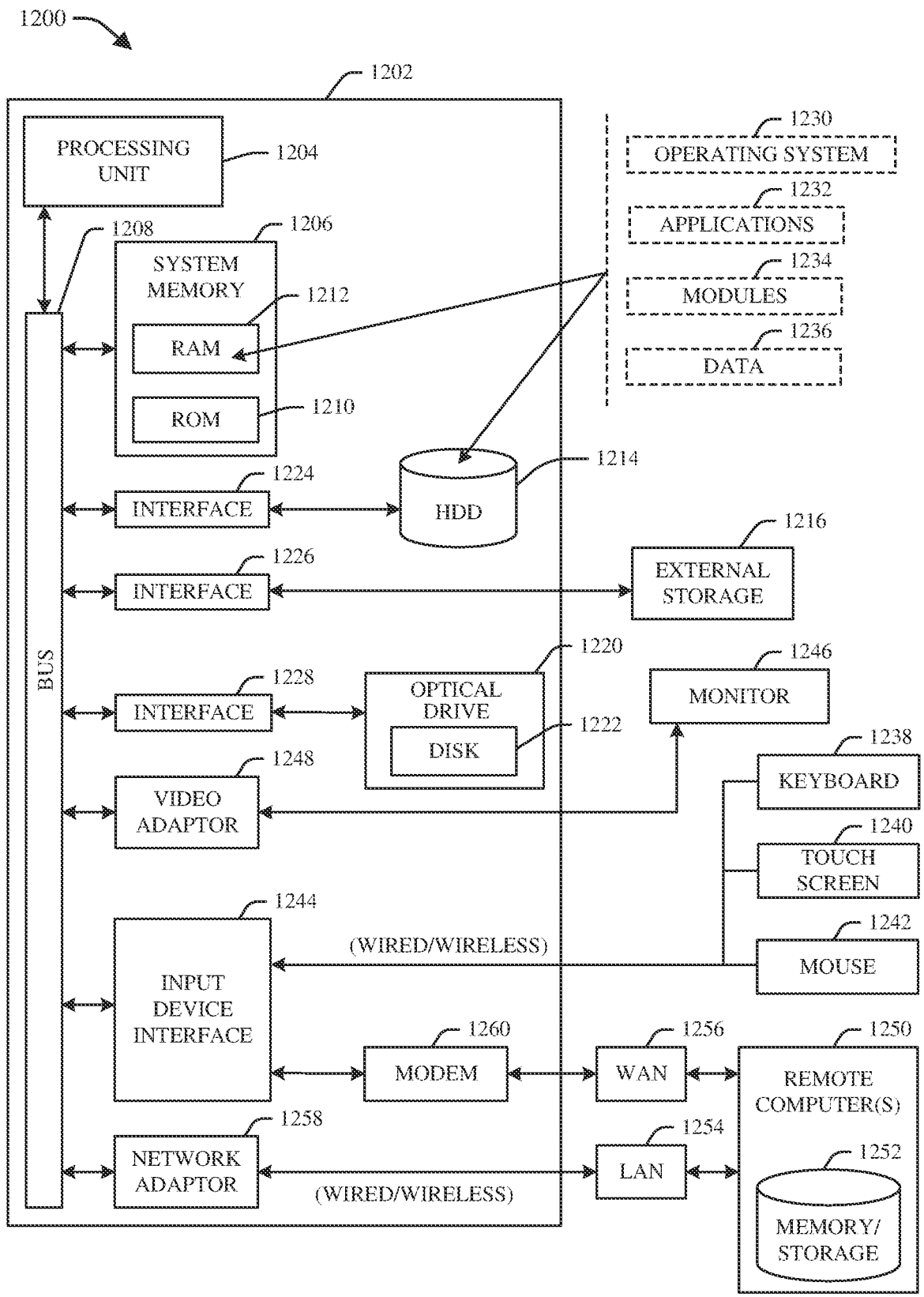
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of storage device) and an optical disk drive 1220 (e.g., which can read or write from a CD-ROM disc, a DVD, a BD, or other disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH™ interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or nonvolatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, communication network, BWP management component, application, service, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, a characteristic associated with an operation of a device that is associated with network equipment of a communication network, based on an analysis of information relating to the operation of the device;
   based on the characteristic associated with the operation of the device, controlling, by the system, switching between a first bandwidth part of a channel bandwidth associated with the device and a second bandwidth part of the channel bandwidth associated with the device;
   determining, by the system, a value associated with the characteristic or a target value associated with the characteristic based on analyzing service-related information relating to a service utilized by the device and traffic-related information relating to data traffic being communicated between the device and the network equipment, wherein the service is related to an application determined to be utilized by the device;

determining, by the system, whether the value or the target value satisfies a defined threshold value relating to the characteristic;

determining, by the system, whether to switch from the first bandwidth part to the second bandwidth part based on a result of the determining of whether the value or the target value satisfies the defined threshold value, wherein the value is a first value, and wherein the target value is a first target value;

in response to determining that the first value or the first target value satisfies the defined threshold value relating to the characteristic, determining, by the system, whether switching from the first bandwidth part to the second bandwidth part will result in an increase of the first value associated with the characteristic;

in response to determining that switching from the first bandwidth part to the second bandwidth part will result in the increase of the value, initiating, by the system, a switch timer that is set for a defined amount of time;

in response to determining that the defined amount of time of the switch timer has elapsed, determining, by the system, whether a second value or a second target value associated with the characteristic satisfies the defined threshold value relating to the characteristic, wherein the second value is same as or different from the first value, and wherein the second target value is same as or different from the first target value; and one of:
in response to determining that the second value or the second target value satisfies the defined threshold value after the defined amount of time of the switch timer is determined to have elapsed, determining, by the system, that a bandwidth part associated with the device is to be switched from the first bandwidth part to the second bandwidth part; or in response to determining that the second value and the second target value do not satisfy the defined threshold value after the defined amount of time of the switch timer is determined to have elapsed, determining, by the system, that the bandwidth part associated with the device is to remain at the first bandwidth part.

2. The method of claim 1, wherein the information relating to the operation of the device is first information relating to the operation of the device that is associated with a first time period, wherein the defined amount of time is a first defined amount of time, and wherein the method further comprises:

performing, by the system, a machine learning analysis on the first information relating to the operation of the device associated with a user identity and second information relating to the operation of the device, wherein the second information is associated with a second time period;

learning, by the system, a device usage pattern, an application usage pattern, or a service usage pattern associated with the device or the user identity based on a result of the machine learning analysis; and adapting, by the system, the first defined amount of time of the switch timer to a second defined amount of time based on the device usage pattern, the application usage pattern, or the service usage pattern, wherein the second defined amount of time of the switch timer is associated with the device or the user identity.

3. The method of claim 1, wherein the characteristic relates to a service type of the service or a communication rate or a data traffic type of the data traffic, wherein the service type is indicative of the communication rate, wherein the service type or the data traffic type is indicative of a defined threshold communication rate applicable in connection with the service, wherein the value corresponds to the communication rate, wherein the defined threshold value is the defined threshold communication rate, and wherein the determining of whether the value associated with the characteristic satisfies the defined threshold value comprises: determining whether the communication rate satisfies the defined threshold communication rate based on analyzing the service type or the communication rate.

4. The method of claim 1, wherein the characteristic relates to a quality of service level associated with the service, wherein a service type of the service or a data traffic type of the data traffic associated with the service is indicative of the quality of service level or a defined threshold quality of service level applicable in connection with the service, wherein the data traffic type relates to the data traffic being communicated between the device and the network equipment in connection with utilizing the application, wherein the value corresponds to the quality of service level, wherein the defined threshold value is the defined threshold quality of service level, and wherein the determining of whether the value associated with the characteristic satisfies the defined threshold value comprises: determining whether the quality of service level satisfies the defined threshold quality of service level based on analyzing the service type or the quality of service level.

5. The method of claim 1, wherein the characteristic is a first characteristic that relates to a communication rate or a quality of service level associated with the data traffic, wherein a second characteristic relates to a power saving mode, a battery power level of a battery, or an external power source associated with the device, wherein the result is a first result, and wherein the method further comprises:

determining, by the system, whether the device is set to the power saving mode, determining, by the system, whether the battery power level of the battery of the device is below a defined threshold battery power level, or determining, by the system, whether the device is connected to the external power source; and determining, by the system, whether to switch from the first bandwidth part to the second bandwidth part based on the first result of the determining of whether the value or the target value satisfies the defined threshold value, a second result of determining whether switching from the first bandwidth part to the second bandwidth part will result in an increase of the value associated with the first characteristic, a third result of the determining of whether the device is set to the power saving mode, a fourth result of the determining of whether the battery power level is below the defined threshold battery power level, or a fifth result of the determining of whether the device is connected to the external power source.

6. The method of claim 5, further comprising:
in response to determining that the device is set to the power saving mode, or in response to determining that the battery power level is below the defined threshold battery power level and the device is not connected to the external power source, determining, by the system, that the bandwidth part associated with the device is to remain at the first bandwidth part and is not to be switched to the second bandwidth part; or in response to determining that the device is not set to the power saving mode, and in response to determining that the battery power level is at or above the defined threshold battery power level or the device is connected to the external power source, determining, by the system, whether to switch from the first bandwidth part to the second bandwidth part based on the result of the determining of whether the value or the target value satisfies the defined threshold value and based on whether switching from the first bandwidth part to the second bandwidth part will result in an increase of the value associated with the first characteristic.

7. The method of claim 1, further comprising:
determining, by the system, a device capability relating to bandwidth part switching of the device, wherein the device capability relates to a first group of bandwidth part types supported by the device and a first number of bandwidth parts supported by the device; and
determining, by the system, a network configuration relating to bandwidth parts that is associated with the communication network, wherein the network configuration indicates a second group of bandwidth part types supported by the communication network and a second number of bandwidth parts supported by the communication network, wherein the first group is same as or different from the second group, and wherein the first number is same as or different from the second number.

8. The method of claim 1, wherein, in a frequency domain, the second bandwidth part is a larger amount of bandwidth than the first bandwidth part.

9. The method of claim 1, wherein, in a time domain, the second bandwidth part relates to a fuller scan of the channel bandwidth, and the first bandwidth part relates to a sparse scan of the channel bandwidth by the device, and wherein the fuller scan of the channel bandwidth involves the device scanning or sampling more regions of the channel bandwidth than the sparse scan of the channel bandwidth.

10. The method of claim 1, wherein a same bandwidth part is utilized for an uplink channel and a downlink channel associated with the device, and wherein the same bandwidth part comprises the first bandwidth part or the second bandwidth part; or
wherein the same bandwidth part or a different bandwidth part is utilized for a supplemental uplink channel associated with the device, and wherein the different bandwidth part comprises the first bandwidth part, the second bandwidth part, or a third bandwidth part.

11. A system, comprising:
a processor; and
a memory that stores executable instructions that, when executed by the processor, facilitate performance of operations, the operations comprising:
based on an analysis of data relating to an operation of a user equipment, determining an attribute associated with an operation of a first user equipment that is associated with network equipment of a communication network;
based on the attribute, managing switching between a first bandwidth part of a carrier bandwidth and a second bandwidth part of the carrier bandwidth associated with the first user equipment;
determining a value or a target value associated with the attribute based on analyzing service-related data relating to a service utilized by the first user equipment and traffic-related data relating to data traffic being communicated between the first user equipment and the network equipment, wherein the service is related to an application determined to be utilized by the first user equipment, and wherein the service-related data indicates a service type of the service;
determining whether the value or the target value satisfies a defined threshold value relating to the attribute;
determining whether the first user equipment is to switch from the first bandwidth part to the second bandwidth part based on a result of the determining of whether the value or the target value satisfies the defined threshold value, wherein the value is a first value, wherein the target value is a first target value;
in response to determining that the first value or the first target value satisfies the defined threshold value relating to the attribute, determining whether switching from the first bandwidth part to the second bandwidth part will result in an increase of the first value associated with the attribute;
in response to determining that switching from the first bandwidth part to the second bandwidth part will result in the increase of the value, initiating a switch timer that is set for a defined length of time;
in response to determining that the defined length of time of the switch timer has elapsed, determining whether a second value or a second target value associated with the attribute satisfies the defined threshold value, wherein the second value is same as or different from the first value, and wherein the second target value is same as or different from the first target value; and
one of:
in response to determining that the second value or the second target value satisfies the defined threshold value after the defined length of time of the switch timer is determined to have elapsed, determining that a bandwidth part associated with the first user equipment is to be switched from the first bandwidth part to the second bandwidth part; or
in response to determining that the second value and the second target value do not satisfy the defined threshold value after the defined length of time of the switch timer is determined to have elapsed, determining that the bandwidth part associated with the first user equipment is to remain at the first bandwidth part.

12. The system of claim 11, wherein the attribute is a first attribute that relates to a communication rate or a quality of service level associated with the data traffic, wherein a second attribute relates to a power saving mode, a battery power level of a battery, or an external power supply associated with the first user equipment, wherein the result is a first result, and wherein the operations further comprise:
determining whether the first user equipment is set to the power saving mode,
determining whether the battery power level of the battery of the first user equipment is below a defined threshold battery power level, or
determining whether the first user equipment is connected to the external power supply; and
determining whether to switch from the first bandwidth part to the second bandwidth part based on the first result of the determining of whether the value or the target value satisfies the defined threshold value, a second result of determining whether switching from the first bandwidth part to the second bandwidth part will result in an increase of the value associated with the first attribute, a third result of the determining of whether the first user equipment is set to the power saving mode, a fourth result of the determining of whether the battery power level is below the defined threshold battery power level, or a fifth result of the determining of whether the first user equipment is connected to the external power supply.

13. The system of claim 11, wherein the operations further comprise:
determining a user equipment capability relating to bandwidth part switching of the first user equipment, wherein the user equipment capability relates to a first group of bandwidth part types supported by the first user equipment and a first number of bandwidth parts supported by the first user equipment; and
determining a network configuration relating to bandwidth parts that is associated with the communication network, wherein the network configuration indicates a second group of bandwidth part types supported by the communication network and a second number of bandwidth parts supported by the communication network, wherein the first group is same as or different from the second group, and wherein the first number is same as or different from the second number.

14. The system of claim 11,
wherein, in a frequency domain, the second bandwidth part is a larger amount of bandwidth than the first bandwidth part; or
wherein, in a time domain, the second bandwidth part relates to a fuller scan of the carrier bandwidth, and the first bandwidth part relates to a sparse scan of the carrier bandwidth by the first user equipment, and wherein the fuller scan of the carrier bandwidth involves the first user equipment scanning or sampling more portions of the carrier bandwidth than the sparse scan of the carrier bandwidth.

15. A non-transitory machine-readable medium, comprising executable instructions that, when executed by a processor, facilitate performance of operations, the operations comprising:
determining a group of characteristics associated with an operation of a device that is associated with network equipment of a communication network, based on an analysis of data relating to the operation of the device;
based on the group of characteristics, controlling transitioning between a first bandwidth portion of a channel bandwidth and a second bandwidth portion of the channel bandwidth associated with the device;
determining a value associated with the group of characteristics or a target value associated with the group of characteristics based on analyzing service-related information relating to a service utilized by the device and traffic-related information relating to data traffic being communicated between the device and the network equipment, wherein the service is related to an application determined to be utilized by the device;
determining whether the value or the target value satisfies a defined threshold value relating to the group of characteristics;
determining whether to switch from the first bandwidth portion to the second bandwidth portion based on a result of the determining of whether the value or the target value satisfies the defined threshold value, wherein the value is a first value, and wherein the target value is a first target value;
in response to determining that the first value or the first target value satisfies the defined threshold value relating to the group of characteristics, determining whether switching from the first bandwidth portion to the second bandwidth portion will result in an increase of the first value associated with the group of characteristics;
in response to determining that switching from the first bandwidth portion to the second bandwidth portion will result in the increase of the value, initiating a switch timer that is set for a defined amount of time;
in response to determining that the defined amount of time of the switch timer has elapsed, determining whether a second value or a second target value associated with the group of characteristics satisfies the defined threshold value relating to the group of characteristics, wherein the second value is same as or different from the first value, and wherein the second target value is same as or different from the first target value; and
one of:
in response to determining that the second value or the second target value satisfies the defined threshold value after the defined amount of time of the switch timer is determined to have elapsed, determining that a bandwidth portion associated with the device is to be switched from the first bandwidth portion to the second bandwidth portion; or
in response to determining that the second value and the second target value do not satisfy the defined threshold value after the defined amount of time of the switch timer is determined to have elapsed, determining that the bandwidth portion associated with the device is to remain at the first bandwidth portion.

16. The non-transitory machine-readable medium of claim 15, wherein the group of characteristics comprises a first characteristic and a second characteristic,
wherein the first characteristic relates to a communication rate or a quality of service level associated with data traffic communicated between the device and the network equipment,
wherein the second characteristic relates to a power saving mode, a battery power level of a battery, or an external power source associated with the device, and
wherein the controlling comprises: based on the first characteristic and the second characteristic, controlling transitioning between the first bandwidth portion and the second bandwidth portion associated with the device.

17. The non-transitory machine-readable medium of claim 15, wherein the data relating to the operation of the device is first data relating to the operation of the device that is associated with a first time period, wherein the defined amount of time is a first defined amount of time, and wherein the operations further comprise:
performing a machine learning analysis on the first data relating to the operation of the device associated with a user identity and second data relating to the operation of the device, wherein the second data is associated with a second time period;
learning a device usage pattern, an application usage pattern, or a service usage pattern associated with the device or the user identity based on a result of the machine learning analysis; and
adapting the first defined amount of time of the switch timer to a second defined amount of time based on the device usage pattern, the application usage pattern, or the service usage pattern, wherein the second defined amount of time of the switch timer is associated with the device or the user identity.

18. The non-transitory machine-readable medium of claim 15, wherein the group of characteristics relates to a service type of the service or a communication rate or a data traffic type of the data traffic, wherein the service type is indicative of the communication rate, wherein the service type or the data traffic type is indicative of a defined threshold communication rate applicable in connection with the service, wherein the value corresponds to the communication rate, wherein the defined threshold value is the defined threshold communication rate, and wherein the determining of whether the value associated with the group of characteristics satisfies the defined threshold value comprises: determining whether the communication rate satisfies the defined threshold communication rate based on analyzing the service type or the communication rate.

19. The non-transitory machine-readable medium of claim 15, wherein the group of characteristics relates to a quality of service level associated with the service, wherein a service type of the service or a data traffic type of the data traffic associated with the service is indicative of the quality of service level or a defined threshold quality of service level applicable in connection with the service, wherein the data traffic type relates to the data traffic being communicated between the device and the network equipment in connection with utilizing the application, wherein the value corresponds to the quality of service level, wherein the defined threshold value is the defined threshold quality of service level, and wherein the determining of whether the value associated with the group of characteristics satisfies the defined threshold value comprises: determining whether the quality of service level satisfies the defined threshold quality of service level based on analyzing the service type or the quality of service level.

20. The non-transitory machine-readable medium of claim 15, wherein the group of characteristics is a first group of characteristics that relates to a communication rate or a quality of service level associated with the data traffic, wherein a second group of characteristics relates to a power saving mode, a battery power level of a battery, or an external power source associated with the device, wherein the result is a first result, and wherein the operations further comprise:

determining whether the device is set to the power saving mode, determining whether the battery power level of the battery of the device is below a defined threshold battery power level, or determining whether the device is connected to the external power source; and determining whether to switch from the first bandwidth portion to the second bandwidth portion based on the first result of the determining of whether the value or the target value satisfies the defined threshold value, a second result of determining whether switching from the first bandwidth portion to the second bandwidth portion will result in an increase of the value associated with the first group of characteristics, a third result of the determining of whether the device is set to the power saving mode, a fourth result of the determining of whether the battery power level is below the defined threshold battery power level, or a fifth result of the determining of whether the device is connected to the external power source.

\* \* \* \* \*